（12) United States Patent
Oshima

(10) Patent No.: US 10,356,301 B2
(45) Date of Patent: Jul. 16, 2019

(54) IMAGING SYSTEM, ANGLE-OF-VIEW ADJUSTMENT METHOD, AND ANGLE-OF-VIEW ADJUSTMENT PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/936,836

(22) Filed: Mar. 27, 2018

(65) Prior Publication Data

US 2018/0295270 A1  Oct. 11, 2018

Related U.S. Application Data

(63) Continuation of application No. PCT/JP2016/076807, filed on Sep. 12, 2016.

(30) Foreign Application Priority Data

Sep. 30, 2015  (JP) .................................. 2015-193484

(51) Int. Cl.
*H04N 5/232* (2006.01)
*H04N 7/18* (2006.01)

(52) U.S. Cl.
CPC ..... *H04N 5/23203* (2013.01); *H04N 5/23254* (2013.01); *H04N 5/23287* (2013.01);
(Continued)

(58) Field of Classification Search
CPC ........... H04N 5/23203; H04N 5/23299; H04N 7/183; H04N 5/232061; H04N 5/23296;
(Continued)

(56) References Cited

U.S. PATENT DOCUMENTS 6,430,471 B1  8/2002  Kintou et al.
2006/0224280 A1  10/2006  Flanigan et al.
2008/0281467 A1  11/2008  Pinter

FOREIGN PATENT DOCUMENTS

JP  10-257375 A  9/1998
JP  11-149315 A  6/1999
(Continued)

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/076807, dated Apr. 12, 2018, with English translation.
(Continued)

*Primary Examiner* — Twyler L Haskins
*Assistant Examiner* — Angel L Garces-Rivera
(74) *Attorney, Agent, or Firm* — Birch, Stewart, Kolasch & Birch, LLP

(57) ABSTRACT

An embodiment of the invention provides an imaging system (10) in which captured data obtained by an imaging unit (22) of a pan/tilt camera (14) provided in a moving body (12) is transmitted and a captured image is displayed on a display screen (200). The imaging system (10) includes a coordinate designation unit (46) that designates designation coordinates and movement destination coordinates as a command to adjust an angle of view, an angle-of-view adjustment period calculation unit (50) that calculates pan/tilt operation parameters, using the designation coordinates and the movement destination coordinates, a movement state calculation unit (52) that calculates a movement state of the imaging unit from the captured data, and a pan/tilt operation parameter correction unit (54) that corrects the pan/tilt operation parameter on the basis of the movement state of the imaging unit.

17 Claims, 12 Drawing Sheets

(52) U.S. Cl.
CPC ..... *H04N 5/23293* (2013.01); *H04N 5/23296* (2013.01); *H04N 5/23299* (2018.08); *H04N 5/232061* (2018.08); *H04N 7/183* (2013.01)

(58) Field of Classification Search
CPC ........... H04N 5/23287; H04N 5/23293; H04N 5/23254
See application file for complete search history.

(56) References Cited

FOREIGN PATENT DOCUMENTS

| | | |
|---|---|---|
| JP | 2000-184469 A | 6/2000 |
| JP | 2000-261792 A | 9/2000 |
| JP | 2007-225809 A | 9/2007 |
| JP | 2009-16956 A | 1/2009 |
| JP | 2009-65605 A | 3/2009 |
| JP | 2010-532109 A | 9/2010 |
| JP | 2014-99719 A | 5/2014 |

OTHER PUBLICATIONS

International Search Report and English translation (Form PCT/ISA/210) for Application No. PCT/JP2016/076807, dated Nov. 1, 2016.

Japanese Decision to Grant a Patent and English translation for Application No. 2017-543085, dated Apr. 25, 2018.

IMAGING SYSTEM, ANGLE-OF-VIEW ADJUSTMENT METHOD, AND ANGLE-OF-VIEW ADJUSTMENT PROGRAM

CROSS-REFERENCE TO RELATED APPLICATIONS

The present application is a Continuation of PCT International Application No. PCT/JP2016/076807 filed on Sep. 12, 2016 claiming priority under 35 U.S.C § 119(a) to Japanese Patent Application No. 2015-193484 filed on Sep. 30, 2015. Each of the above applications is hereby expressly incorporated by reference, in their entirety, into the present application.

BACKGROUND OF THE INVENTION

1. Field of the Invention

The present invention relates to an imaging system, an angle-of-view adjustment method, and an angle-of-view adjustment program, and more particularly, to a technique that adjusts the angle of view of a remotely controlled pan/tilt camera.

2. Description of the Related Art

A technique has been proposed which simply adjusts the angle of view using a remote control terminal with a display function in an imaging system that is connected to the remote control terminal by communication. The term "pan/tilt operation" means a camera panning operation and a camera tilting operation. In some cases, the panning operation is referred to as a pan operation. In addition, in some cases, the tilting operation is referred to as a tilt operation.

JP2009-16956A discloses an imaging system that controls the imaging direction of a camera provided in a remotely controlled moving body. The imaging system disclosed in JP2009-16956A moves the imaging direction, using an indication vector indicated by a cursor displayed on a display unit. The term "imaging system" in the specification corresponds to a camera control system in JP2009-16956A.

JP2009-65605A discloses a mobile imaging device that captures an image of an object while being moved. In the imaging device disclosed in JP2009-65605A, in a case in which the entire imaging device is moved in association with the movement of an object, an angle formed between the traveling direction of the imaging device and the optical axis of a camera increases with the movement of the imaging device and the optical axis of the camera passes through the same point on the object.

JP2000-261792A discloses a surveillance camera that is remotely controlled. The surveillance camera disclosed in JP2000-261792A is stopped at a preset position and captures images.

JP1998-257375A (JP-H10-257375A) discloses an imaging device which displays an image captured by a pan/tilt camera on an operation region of a screen and controls the pan/tilt camera such that a designated object is oriented to a central position of the operation region in a case in which an arbitrary position on the operation region is designated.

JP2014-99719A discloses an imaging system which, in a case in which an object to be moved to a central position of the field of view on a tablet terminal is designated by two fingers, performs pan and tilt operations to move the object to the central position of the field of view. The term "imaging system" in the specification corresponds to a camera system in JP2014-99719A.

SUMMARY OF THE INVENTION

In the related art, in a method for operating the imaging system that is connected to the remote control terminal with a display function by communication, the operation of a fixed camera is a basic operation. However, in recent years, a technique has been proposed in which a pan/tilt camera is provided in a moving body.

In the imaging system in which the pan/tilt camera is provided in the moving body, it is assumed that the pan/tilt operation of the pan/tilt camera is controlled independently of control for the movement of the moving body while the moving body is being moved.

However, in a case in which the pan/tilt operation is controlled by communication, a delay depending on communication occurs between the time when the pan/tilt operation is instructed and the time when the actual pan/tilt operation is performed. In a case in which the angle of view is adjusted while the moving body is being moved in a state in which the delay depending on communication occurs, there is a difference between the time when the operation is performed and the time when the operation is reflected, which makes it difficult to move the moving body such that the angle of view is adjusted to a desired value.

In the imaging system disclosed in JP2009-16956A, in a case in which an indication vector is input while the moving body is being moved, the coordinates of a starting point of the indication vector are shifted. As a result, it is difficult to accurately adjust the imaging direction after the moving body is moved.

The mobile imaging device disclosed in JP2009-65605A needs to have means for acquiring the moving speed of the moving body. In addition, the mobile imaging device disclosed in JP2009-65605A has the problem that motion blur occurs due to the relative movement between the camera and the object within the exposure time of the camera. As a result, it is difficult to respond to the movement of the moving body for a long period that is longer than the exposure time of the camera.

The surveillance camera disclosed in JP2000-261792A does not have a pan/tilt operation function. Therefore, the pan/tilt operation of the surveillance camera is not performed while the surveillance camera is being moved between different preset positions and the surveillance camera does not have the problem that the deviation of the angle of view occurs due to a delay depending on communication in a case in which the pan/tilt operation is performed while the surveillance camera is being moved.

The pan/tilt camera disclosed in JP1998-257375A (JP-H10-257375A) and the camera disclosed in JP2014-99719A are not moved relative to the object and do not perform the pan/tilt operation while being moved relative to the object. Therefore, the pan/tilt camera and the camera do not have the problem that the deviation of the angle of view occurs due to a delay depending on communication in a case in which the pan/tilt operation is performed while the cameras are being moved.

The invention has been made in view of the above-mentioned problems and an object of the invention is to provide an imaging system, an angle-of-view adjustment method, and an angle-of-view adjustment program that can correct the deviation of the angle of view caused by a delay depending on communication.

In order to achieve the object, the invention provides the following aspects.

An imaging system according to a first aspect includes: a moving body; an imaging unit that is provided in the moving body; a captured data transmission unit that transmits captured data obtained by an imaging operation of the imaging unit; a captured data receiving unit that receives the captured data transmitted from the captured data transmission unit; a pan/tilt operation unit that instructs the imaging unit to perform at least one of a pan operation or a tilt operation; an imaging operation unit that is connected to the imaging unit so as to communicate with the imaging unit and transmits an imaging control signal for operating the imaging unit to the imaging unit; a display unit that displays a captured image indicated by the captured data received by the captured data receiving unit on a display screen; a coordinate designation unit that designates designation coordinates which are coordinates of a movement target and movement destination coordinates which are coordinates of a movement destination of the movement target in the image displayed on the display screen of the display unit in a case in which an angle of view of the imaging unit is adjusted; an angle-of-view adjustment operation unit that calculates pan/tilt operation parameters applied to the pan/tilt operation unit, using the designation coordinates and the movement destination coordinates; an angle-of-view adjustment period calculation unit that calculates an angle-of-view adjustment period which is a period from the designation of the designation coordinates to the adjustment of the angle of view of the imaging unit; a movement state calculation unit that calculates motion parameters indicating a moving direction and a movement distance in a case in which the imaging unit is moved by the movement of the moving body for the angle-of-view adjustment period from the captured data obtained by the imaging operation of the imaging unit; a pan/tilt operation parameter correction unit that corrects the pan/tilt operation parameters calculated by the angle-of-view adjustment operation unit on the basis of the motion parameters calculated by the movement state calculation unit and the angle-of-view adjustment period calculated by the angle-of-view adjustment period calculation unit in a case in which the angle of view of the imaging unit is adjusted; and a pan/tilt operation command unit that transmits a signal corresponding to the pan/tilt operation parameters to the pan/tilt operation unit, using communication, and transmits a signal corresponding to the pan/tilt operation parameters corrected by the pan/tilt operation parameter correction unit to the pan/tilt operation unit.

According to the first aspect, the motion parameters indicating the moving direction and the movement distance in a case in which the imaging unit is moved are calculated from the captured data obtained by the imaging operation of the imaging unit and the operation parameters of the pan/tilt operation unit in a case in which the pan/tilt operation unit adjusts the angle of view of the imaging unit are corrected. Therefore, it is possible to respond to various movement states of the imaging unit. In a case in which an operation command is transmitted to the pan/tilt operation unit while the imaging unit is being moved, it is possible to perform a pan/tilt operation in which the deviation of the angle of view caused by a delay depending on communication has been corrected.

According to a second aspect, in the imaging system according to the first aspect, the angle-of-view adjustment operation unit may calculate a first motion vector as the pan/tilt operation parameters from the designation coordinates and the movement destination coordinates. The movement state calculation unit may calculate a correction vector as the motion parameters of the imaging unit during the angle-of-view adjustment period. The pan/tilt operation parameter correction unit may correct the pan/tilt operation parameters indicated by the first motion vector, using the correction vector.

According to the second aspect, it is possible to check the movement state of the imaging unit, using the coordinates on the display screen of the display unit.

According to a third aspect, in the imaging system according to the second aspect, the movement state calculation unit may calculate, as the correction vector, a velocity vector indicating a velocity of the imaging unit in a case in which the imaging unit is moved by the movement of the moving body for the angle-of-view adjustment period and an acceleration vector indicating acceleration of the imaging unit in a case in which the imaging unit is moved by the movement of the moving body for the angle-of-view adjustment period.

According to the third aspect, the movement state of the imaging unit can be checked by vector calculation using the coordinates on the display screen of the display unit.

In the third aspect, the velocity vector and the acceleration vector can be calculated as components of each axis in the display screen. In a case in which a rectangular coordinate system formed by the X-axis and the Z-axis is set to the display screen, an X component and a Z component of each of the velocity vector and the acceleration vector can be calculated.

According to a fourth aspect, in the imaging system according to the third aspect, the movement state calculation unit may acquire the first motion vector indicating a movement distance and a moving direction of the imaging unit for a first period between a first time and a second time before the first time, from first captured data which is acquired by the imaging operation of the imaging unit at the first time and second captured data which is acquired by the imaging operation of the imaging unit at the second time. The movement state calculation unit may calculate a first velocity vector that has a magnitude obtained by dividing a magnitude of the first motion vector by the first period and has a direction parallel to a direction indicated by the first motion vector.

According to the fourth aspect, it is possible to calculate the velocity vector of the imaging unit from two captured data items acquired in time series.

According to a fifth aspect, in the imaging system according to the fourth aspect, the movement state calculation unit may use feature point detection to acquire the first motion vector.

According to the fifth aspect, it is possible to calculate the velocity vector of the imaging unit from two captured data items acquired in time series, using feature point detection.

An example of the feature point detection in the fifth aspect is template matching.

According to a sixth aspect, in the imaging system according to the fourth aspect or the fifth aspect, the movement state calculation unit may acquire a second motion vector indicating a movement distance and a moving direction of the imaging unit for a second period between the second time and a third time before the second time, from the second captured data and third captured data which is acquired by the imaging operation of the imaging unit at the third time. The movement state calculation unit may calculate a second velocity vector that has a magnitude obtained by dividing a magnitude of the second motion vector by the second period and has a direction parallel to a direction indicated by the second motion vector. The movement state calculation unit may calculate an acceleration vector that has a magnitude obtained by dividing a magnitude of a difference vector, which is obtained by subtracting the second velocity vector from the first velocity vector, by the first period and has a direction parallel to the difference vector.

According to the sixth aspect, it is possible to calculate the acceleration vector from three captured data items acquired in time series.

According to a seventh aspect, in the imaging system according to any one of the fourth to sixth aspects, the movement state calculation unit may use the latest captured data acquired by the imaging operation of the imaging unit as the first captured data.

According to the seventh aspect, it is possible to calculate the motion vector, velocity vector, and acceleration vector of the imaging unit, using the latest captured data.

In the third to seventh aspects, an aspect in which captured data is acquired in time series by a first-in first-out process and is then stored can be applied.

According to an eighth aspect, in the imaging system according to any one of the first to seventh aspects, the angle-of-view adjustment operation unit may calculate, as the pan/tilt operation parameters, an operating speed of the pan/tilt operation unit from a predetermined pan/tilt operation period from the start of a pan/tilt operation to the completion of the pan/tilt operation, the designation coordinates, and the movement destination coordinates.

According to the eighth aspect, it is possible to calculate the operating speed of the pan/tilt operation unit from the pan/tilt operation period, the designation coordinates, and the movement destination coordinates.

According to a ninth aspect, the imaging system according to the eighth aspect may further include an angle-of-view information acquisition unit that acquires information about the angle of view of a lens included in the imaging unit. The angle-of-view adjustment operation unit may calculate the pan/tilt operation period, using a maximum operating speed of the pan/tilt operation unit and the angle of view of the lens included in the imaging unit.

According to the ninth aspect, it is possible to calculate the pan/tilt operation period from the angle of view of the lens and the maximum operating speed of the pan/tilt operation unit.

According to a tenth aspect, the imaging system according to the ninth aspect may further include a coordinate conversion processing unit that performs a polar coordinate conversion process of converting the designation coordinates and the movement destination coordinates represented by a two-dimensional coordinate system into three-dimensional coordinates, using the information about the angle of view of the imaging unit acquired by the angle-of-view information acquisition unit. The movement state calculation unit may calculate, as the pan/tilt operation parameters of the pan/tilt operation unit, displacement angles of the designation coordinates and the movement destination coordinates in the three-dimensional coordinate system converted by the coordinate conversion processing unit.

According to the tenth aspect, the two-dimensional coordinate system is converted into the three-dimensional coordinate system. Therefore, the motion vector, the velocity vector, and the acceleration vector on the display screen represented by the two-dimensional coordinate system can be converted into the pan/tilt operation represented by the three-dimensional coordinate system.

According to an eleventh aspect, the imaging system according to any one of the first to tenth aspects may further include: a captured data communication period acquisition unit that acquires a captured data communication period which is a communication period of the captured data acquired by the imaging operation of the imaging unit; an operation command communication period acquisition unit that acquires an operation command communication period which is a communication period of the operation command transmitted from the pan/tilt operation command unit; and a pan/tilt operation period acquisition unit that acquires a pan/tilt operation period from the acquisition of the operation command by the pan/tilt operation unit to the completion of the operation of the pan/tilt operation unit. The angle-of-view adjustment period calculation unit may add the captured data communication period acquired by the captured data communication period acquisition unit, the operation command communication period acquired by the operation command communication period acquisition unit, and the pan/tilt operation period acquired by the pan/tilt operation period acquisition unit to calculate the angle-of-view adjustment period.

According to the eleventh aspect, it is possible to calculate the angle-of-view adjustment period which is the sum of the communication period of the captured data, the communication period of the operation command, and the pan/tilt operation period.

According to a twelfth aspect, the imaging system according to the eleventh aspect may further include a communication period measurement unit that measures a period from a time when a captured data transmission request is transmitted to the imaging unit to a time when the captured data transmitted from the imaging unit is received. The captured data communication period acquisition unit may acquire the period measured by the communication period measurement unit as the captured data communication period.

According to the twelfth aspect, the captured data communication period can be acquired by measurement.

According to a thirteenth aspect, in the imaging system according to the twelfth aspect, the captured data communication period acquisition unit may acquire an average of a plurality of measurement results of the communication period measurement unit as the captured data communication period.

According to the thirteenth aspect, even in a case in which there is a variation in the measurement of the captured data communication period, it is possible to acquire the captured data communication period with high reliability which is less affected by the variation in measurement.

According to a fourteenth aspect, the imaging system according to any one of the first to thirteenth aspects may further include a moving body remote control unit that remotely controls the moving body and is provided independently of the imaging operation unit.

According to the fourteenth aspect, it is possible to check the movement state of the imaging unit from the captured data, without using control parameters for the moving body and the detection results and the measurement results used to control the moving body.

According to a fifteenth aspect, in the imaging system according to any one of the first to fourteenth aspects, the angle-of-view adjustment operation unit may use coordinates of a central position of the display screen as the movement destination coordinates.

According to the fifteenth aspect, it is possible to display a designated object at the central position of the display screen in the imaging operation of the imaging unit that is moved in association with the movement of the moving body.

An angle-of-view adjustment according to a sixteenth aspect is a method for adjusting an angle of view of an imaging unit that is provided in a moving body and is capable of performing at least one of a pan operation or a tilt operation. The method includes: a captured data transmission step of transmitting captured data obtained by an imaging operation of the imaging unit; a captured data receiving step of receiving the captured data transmitted in the captured data transmission step; an imaging operation step of transmitting an imaging control signal for operating the imaging unit to the imaging unit, using communication; a display step of displaying a captured image indicated by the captured data received in the captured data receiving step on a display screen; a coordinate designation step of designating designation coordinates which are coordinates of a movement target and movement destination coordinates which are coordinates of a movement destination of the movement target in the image displayed on the display screen in a case in which the angle of view of the imaging unit is adjusted; an angle-of-view adjustment operation step of calculating pan/tilt operation parameters, using the designation coordinates and the movement destination coordinates; an angle-of-view adjustment period calculation step of calculating an angle-of-view adjustment period which is a period from the designation of the designation coordinates to the adjustment of the angle of view of the imaging unit; a movement state calculation step of calculating motion parameters indicating a moving direction and a movement distance in a case in which the imaging unit is moved by the movement of the moving body for the angle-of-view adjustment period from the captured data obtained by the imaging operation of the imaging unit; a pan/tilt operation parameter correction step of correcting the pan/tilt operation parameters calculated in the angle-of-view adjustment operation step on the basis of the motion parameters calculated in the movement state calculation step and the angle-of-view adjustment period calculated in the angle-of-view adjustment period calculation step in a case in which the angle of view of the imaging unit is adjusted; and a pan/tilt operation command step of instructing the imaging unit to perform at least one of the pan operation or the tilt operation on the basis of the pan/tilt operation parameters corrected in the pan/tilt operation parameter correction step.

According to the sixteenth aspect, it is possible to obtain the same effect as that in the first aspect.

In the sixteenth aspect, the same matters as those specified in the second to the fifteenth aspects may be appropriately combined with each other. In this case, means in charge of the processes or the functions specified in the imaging system can be construed as the components of the angle-of-view adjustment method which are in charge of processes or functions corresponding to the processes or the functions.

An angle-of-view adjustment program according to a seventeenth aspect is a display control program that causes a computer to function as: imaging means provided in a moving body; captured data transmission means for transmitting captured data obtained by an imaging operation of the imaging means; captured data receiving means for receiving the captured data transmitted from the captured data transmission means; pan/tilt operation means for instructing the imaging means to perform at least one of a pan operation or a tilt operation; imaging operation means that is connected to the imaging means so as to communicate with the imaging means and transmits an imaging control signal for operating the imaging means to the imaging means; display means for displaying a captured image indicated by the captured data received by the captured data receiving means on a display screen; coordinate designation means for designating designation coordinates which are coordinates of a movement target and movement destination coordinates which are coordinates of a movement destination of the movement target in the image displayed on the display screen of the display means in a case in which an angle of view of the imaging means is adjusted; angle-of-view adjustment operation means for calculating pan/tilt operation parameters applied to the pan/tilt operation means, using the designation coordinates and the movement destination coordinates; angle-of-view adjustment period calculation means for calculating an angle-of-view adjustment period which is a period from the designation of the designation coordinates to the adjustment of the angle of view of the imaging means; movement state calculation means for calculating motion parameters indicating a moving direction and a movement distance in a case in which the imaging means is moved by the movement of the moving body for the angle-of-view adjustment period from the captured data obtained by the imaging operation of the imaging means; pan/tilt operation parameter correction means for correcting the pan/tilt operation parameters calculated by the angle-of-view adjustment operation means on the basis of the motion parameters calculated by the movement state calculation means and the angle-of-view adjustment period calculated by the angle-of-view adjustment period calculation means in a case in which the angle of view of the imaging means is adjusted; and pan/tilt operation command means for transmitting a signal corresponding to the pan/tilt operation parameters to the pan/tilt operation means, using communication, and transmitting a signal corresponding to the pan/tilt operation parameters corrected by the pan/tilt operation parameter correction means to the pan/tilt operation means. In addition, a computer-readable non-transitory tangible medium that stores the above-mentioned program is included in an aspect of the invention.

According to the seventeenth aspect, it is possible to obtain the same effect as that in the first aspect.

In the seventeenth aspect, the same matters as those specified in the second to the fifteenth aspects may be appropriately combined with each other. In this case, means in charge of the processes or the functions specified in the imaging system can be construed as the components of the angle-of-view adjustment program which are in charge of processes or functions corresponding to the processes or the functions.

According to the invention, the motion parameters indicating the moving direction and the movement distance in a case in which the imaging unit is moved are calculated from the captured data obtained by the imaging operation of the imaging unit and the operation parameters of the pan/tilt operation unit in a case in which the angle of view of the imaging unit is adjusted by the pan/tilt operation unit are corrected. Therefore, it is possible to respond to various movement states of the imaging unit. In a case in which an operation command is transmitted to the pan/tilt operation unit while the imaging unit is being moved, it is possible to perform a pan/tilt operation in which the deviation of the angle of view caused by a delay depending on communication has been corrected.

BRIEF DESCRIPTION OF THE DRAWINGS

FIG. 7A is a diagram schematically illustrating a display state before coordinates are input. FIG. 7B is a diagram schematically illustrating a display state after the coordinates are input.

FIG. 8A is a diagram schematically illustrating a display state before coordinates are designated. FIG. 8B is a diagram schematically illustrating a display state after the coordinates are designated.

DESCRIPTION OF THE PREFERRED EMBODIMENTS

Hereinafter, preferred embodiments of the invention will be described with reference to the accompanying drawings.

[Description of Imaging System]

<Overall Configuration>

Figure 1:
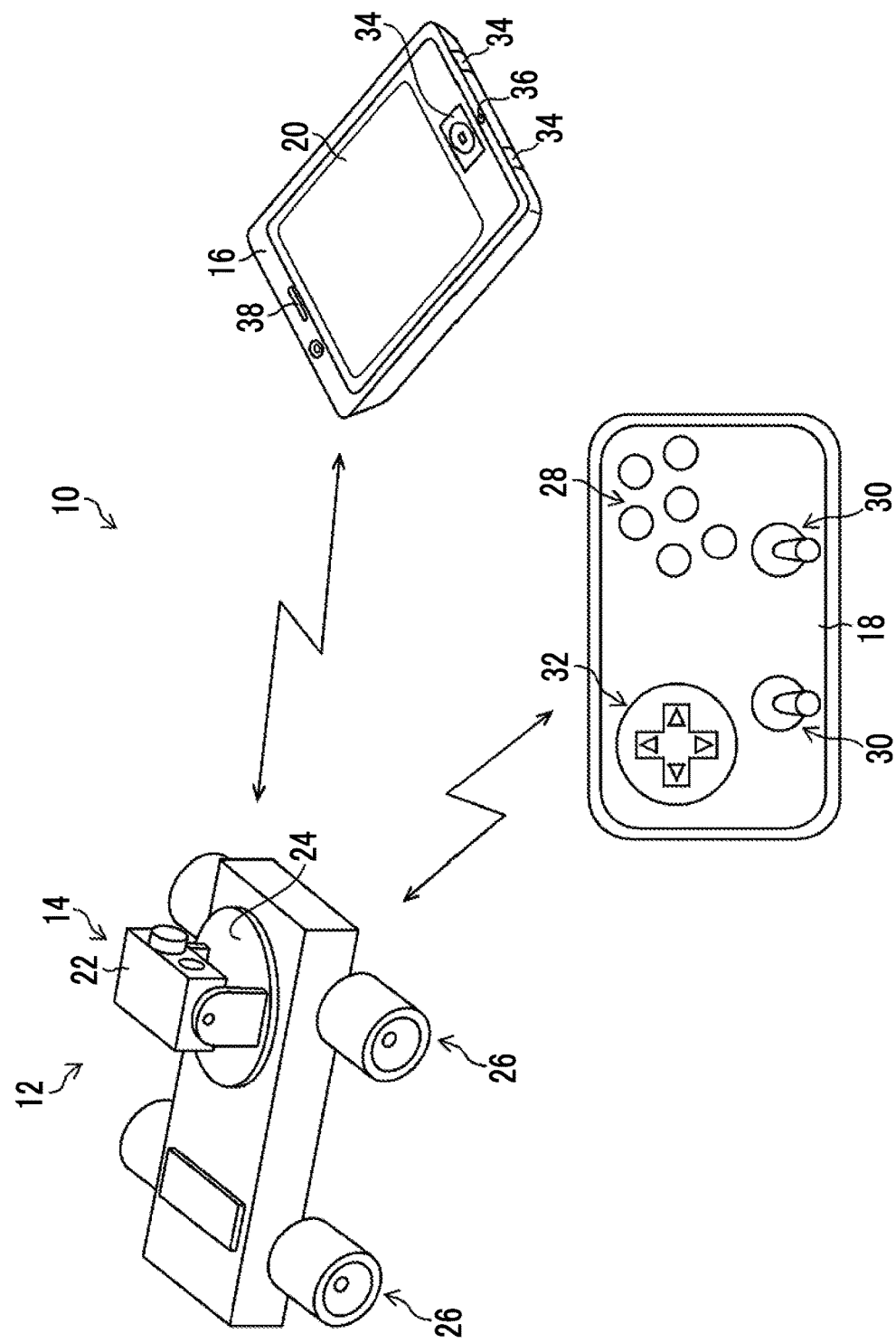
FIG. 1 is a diagram illustrating the overall configuration of an imaging system.

FIG. 1 is a diagram illustrating the overall configuration of an imaging system. An imaging system 10 illustrated in FIG. 1 includes a moving body 12, a pan/tilt camera 14, an imaging operation unit 16, and a moving body operation unit 18. The pan/tilt camera 14 is provided in the moving body 12.

The pan/tilt camera 14 is moved together with the moving body 12 in association with the movement of the moving body 12. In the following description, the movement of the moving body 12 and the movement of the pan/tilt camera 14 can be substituted with each other in the description related to the pan/tilt camera 14.

The moving body 12 and the pan/tilt camera 14 illustrated in FIG. 1 are controlled by different operation means. The moving body 12 receives a control signal from the moving body operation unit 18 and is moved on the basis of the control signal. In addition, the moving body 12 transmits moving body status information to the moving body operation unit 18.

The moving body operation unit 18 is a moving body remote control unit that remotely controls the moving body and is an aspect of a moving body remote control unit that is provided independently of the imaging operation unit.

An imaging operation of the pan/tilt camera 14 is controlled by an imaging control signal transmitted from the imaging operation unit 16. Captured data obtained by the imaging operation of the pan/tilt camera 14 is transmitted to the imaging operation unit 16. A live view image captured by the pan/tilt camera 14 is displayed on a display unit 20 of the imaging operation unit 16. Hereinafter, in some cases, the live view image displayed on the display unit 20 is simply referred to as an image.

The imaging operation unit 16 that is connected to the pan/tilt camera 14 so as to communicate with the pan/tilt camera 14 corresponds to imaging operation means. The display unit 20 corresponds to display means.

The pan/tilt camera 14 includes an imaging unit 22 and a pan/tilt operation unit 24. The imaging unit 22 is attached to the pan/tilt operation unit 24. In a case in which the pan/tilt operation unit 24 is operated by pan/tilt operation parameters transmitted from the imaging operation unit 16, the angle of view of the imaging unit 22 is adjusted according to the operation of the pan/tilt operation unit 24. In the following description, the movement of the pan/tilt camera 14 and the movement of the imaging unit 22 can be substituted with each other in the description related to the pan/tilt camera 14.

The imaging unit 22 corresponds to imaging means. The pan/tilt operation unit 24 corresponds to pan/tilt operation means.

A touch panel is applied as the display unit 20. An operator touches a display screen of the display unit 20 to designate arbitrary coordinates on the display screen of the display unit 20, which will be described in detail below. For example, in FIG. 8A, the display screen of the display unit 20 is represented by reference numeral 200.

The imaging system 10 is configured such that the pan/tilt camera 14 and the imaging operation unit 16 can wirelessly communicate with each other. In addition, the moving body 12 and the moving body operation unit 18 can wirelessly communicate with each other. The communication between the pan/tilt camera 14 and the imaging operation unit 16 is not limited to wireless communication. Wired communication may be applied. In addition, the communication between the moving body 12 and the moving body operation unit 18 may be wired communication.

For example, the following communication method can be used: a communication method based on a LAN according to an IEEE802.11a/b/g/n standard defined by IEEE; or a communication method based on near field communication according to a Bluetooth standard.

The IEEE is an abbreviation of The Institute of Electrical and Electronics Engineers, Inc. The LAN is an abbreviation of a local area network. The Bluetooth is a registered trademark.

The moving body 12 illustrated in FIG. 1 includes a running unit 26. The running unit 26 is operated by a motor (not illustrated). The operation of the motor (not illustrated) is controlled by a running control signal transmitted from the moving body operation unit 18 to the moving body 12 to control the start or running, the stop of running, the running speed, or the running direction of the moving body 12.

In this embodiment, an example of the operation member is the moving body operation unit 18 including an operation button 28, a lever 30, and a cross key 32. However, other types of operation members may be provided.

In this embodiment, a smart-phone-type portable terminal is given as an example of the imaging operation unit 16. The imaging operation unit 16 which is a smart-phone-type portable terminal illustrated in FIG. 1 includes an operation button 34, a microphone 36, and a speaker 38. A tablet-type terminal device or a fixed terminal device, such as a personal computer, may be applied as the imaging operation unit 16.

<Description of Imaging Operation Unit>

Figure 2:
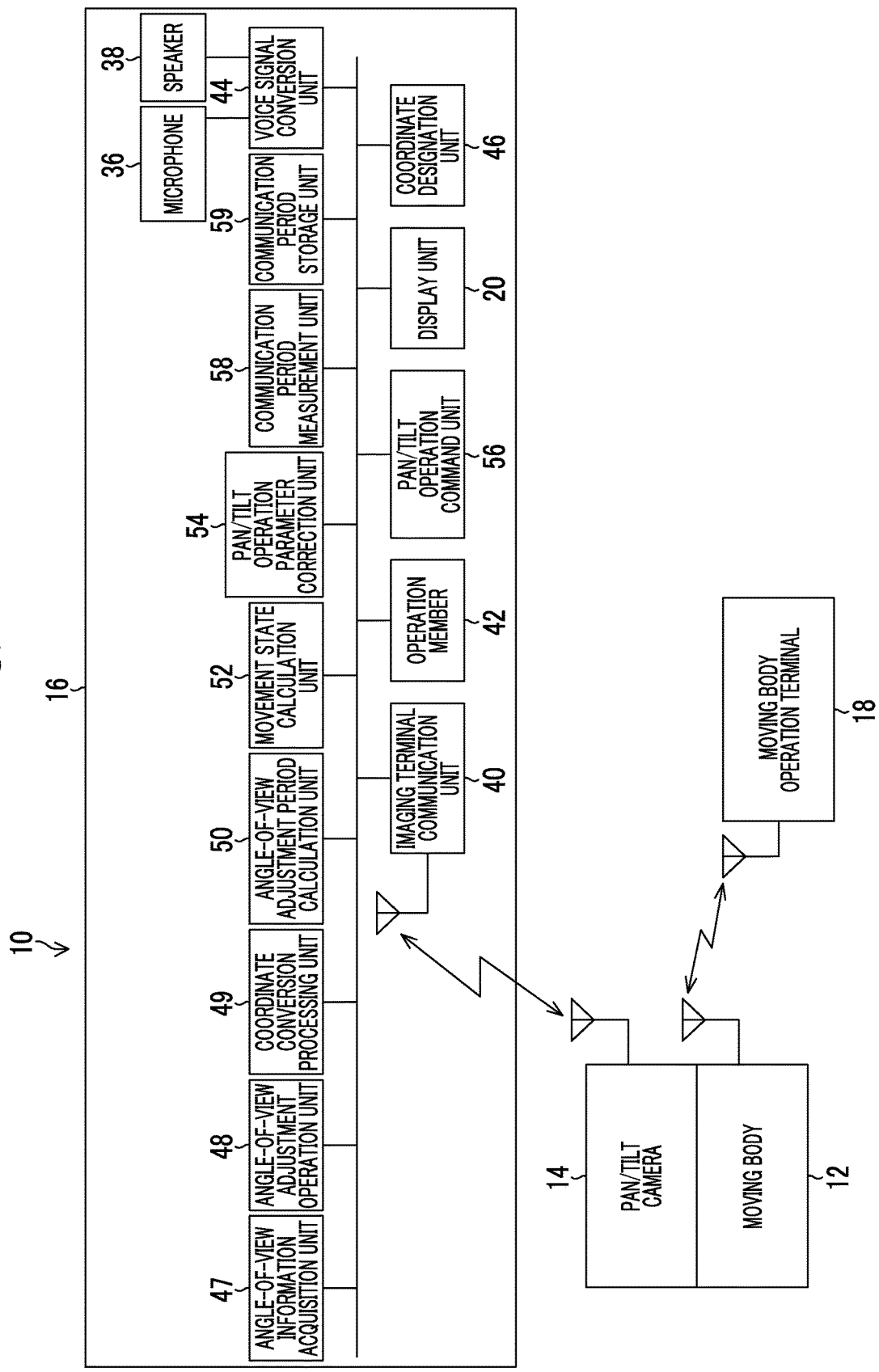
FIG. 2 is a block diagram illustrating the imaging system.
Figure 3:
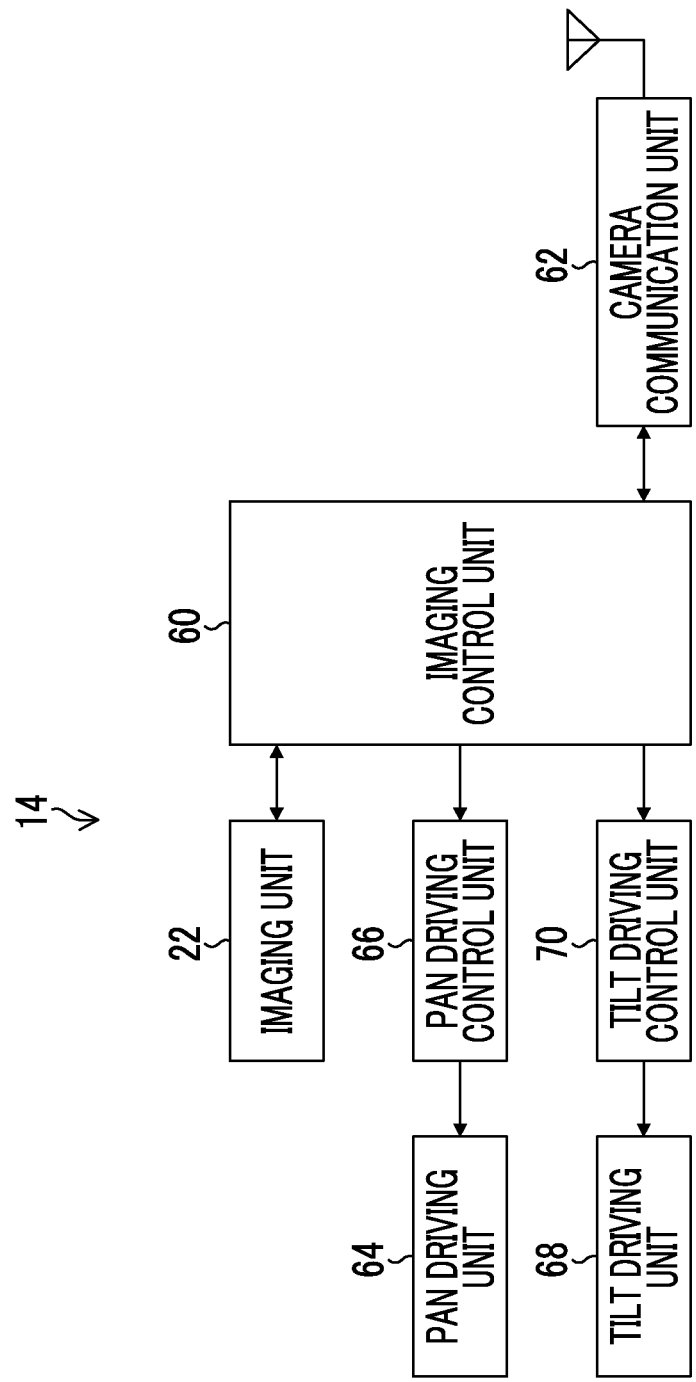
FIG. 3 is a block diagram illustrating a pan/tilt camera.

FIG. 2 is a block diagram illustrating the imaging system. In FIG. 2, the same components as those illustrated in FIG. 1 are denoted by the same reference numerals and the description thereof will be appropriately omitted. In FIG. 3 and the subsequent drawings, the same components as described above are denoted by the same reference numerals and the description thereof will be appropriately omitted.

The imaging operation unit 16 illustrated in FIG. 2 includes an imaging terminal communication unit 40. The imaging terminal communication unit 40 receives the captured data transmitted from the pan/tilt camera 14. In addition, the imaging terminal communication unit 40 transmits an imaging control signal to the pan/tilt camera 14. The imaging control signal includes commands related to imaging control in the pan/tilt camera 14 including an imaging start command, an imaging stop command, or a command to adjust the pan/tilt camera 14 such as a zoom command.

The captured data means image data obtained by an imaging operation. In some cases, the captured data is simply referred to as image data. In the specification, it is assumed that image data obtained by an imaging operation is referred to as captured data.

The imaging terminal communication unit 40 is a component of a captured data receiving unit and captured data receiving means.

The imaging operation unit 16 includes an operation member 42. The operation member 42 includes an operation button displayed on the display screen of the display unit 20. The operation button displayed on the display screen of the display unit 20 is not illustrated in the drawings.

The imaging operation unit 16 includes a voice signal conversion unit 44. The voice signal conversion unit 44 converts a voice signal acquired from the microphone 36 into an electric signal. In addition, the voice signal conversion unit 44 converts an electric signal corresponding to the voice to be output from the speaker 38 into a voice signal.

The imaging operation unit 16 includes a coordinate designation unit 46. The coordinate designation unit 46 designates arbitrary coordinates on the display screen of the display unit 20. For example, in a case in which an arbitrary position on the display screen of the display unit 20 is touched, the touched position is detected and converted into coordinates on the display screen of the display unit 20.

The coordinate designation unit 46 corresponding to coordinate designation means.

The imaging operation unit 16 includes an angle-of-view information acquisition unit 47. The angle-of-view information acquisition unit 47 acquires information about the angle of view of a lens included in the imaging unit 22 illustrated in FIG. 1. The angle-of-view information acquisition unit 47 illustrated in FIG. 2 may be an angle-of-view information storage unit that stores information about the angle of view of the imaging unit 22 illustrated in FIG. 1.

The imaging operation unit 16 includes an angle-of-view adjustment operation unit 48. The angle-of-view adjustment operation unit 48 performs an angle-of-view adjustment operation of calculating pan/tilt operation parameters, using first coordinates and second coordinates designated by the coordinate designation unit 46. The pan/tilt operation parameters include pan operation parameters and tilt operation parameters.

The angle-of-view adjustment operation unit 48 corresponds to angle-of-view adjustment operation means.

The imaging operation unit 16 includes a coordinate conversion processing unit 49. The coordinate conversion processing unit 49 performs a coordinate conversion process of converting the pan/tilt operation parameters in a two-dimensional rectangular coordinate system into a three-dimensional coordinate system. The coordinate conversion process will be described in detail below.

The imaging operation unit 16 includes an angle-of-view adjustment period calculation unit 50. The angle-of-view adjustment period calculation unit 50 calculates an angle-of-view adjustment period. The angle-of-view adjustment period calculated by the angle-of-view adjustment period calculation unit 50 is used to correct the pan/tilt operation parameters calculated by the angle-of-view adjustment operation unit 48. The angle-of-view adjustment period will be described in detail below.

The angle-of-view adjustment period calculation unit 50 corresponds to angle-of-view adjustment period calculation means.

The imaging operation unit 16 illustrated in FIG. 2 includes a movement state calculation unit 52. The movement state calculation unit 52 calculates motion parameters indicating the moving direction and the movement distance of the pan/tilt camera 14 in a case in which the pan/tilt camera 14 is moved by the movement of the moving body 12 for the angle-of-view adjustment period calculated by the angle-of-view adjustment period calculation unit 50.

The motion parameters of the pan/tilt camera 14 calculated by the movement state calculation unit 52 are used to correct the pan/tilt operation parameters calculated by the angle-of-view adjustment operation unit 48. The motion parameters of the pan/tilt camera 14 will be described in detail below.

The movement state calculation unit 52 corresponds to movement state calculation means.

The imaging operation unit 16 illustrated in FIG. 2 includes a pan/tilt operation parameter correction unit 54. The pan/tilt operation parameter correction unit 54 corrects the pan/tilt operation parameters, on the basis of the angle-of-view adjustment period calculated by the angle-of-view adjustment period calculation unit 50 and the motion parameters of the pan/tilt camera 14 calculated by the movement state calculation unit 52. The correction of the pan/tilt operation parameters will be described in detail below.

The pan/tilt operation parameter correction unit 54 corresponds to pan/tilt operation parameter correction means.

The imaging operation unit 16 illustrated in FIG. 2 includes a pan/tilt operation command unit 56. The pan/tilt operation command unit 56 transmits the pan/tilt operation parameters which have been calculated by the angle-of-view adjustment operation unit 48 and then corrected by the pan/tilt operation parameter correction unit 54 to the pan/tilt operation unit 24.

The imaging operation unit 16 illustrated in FIG. 2 includes a communication period measurement unit 58. The communication period measurement unit 58 measures a communication period between the pan/tilt camera 14 and the imaging operation unit 16. An example of the configuration of the communication period measurement unit 58 is an aspect including a timer, a counter, and a memory.

For the measurement of the communication period, a period from the start of transmission to the end of transmission or a period from the start of transmission to the stop of transmission due to a failure in transmission is measured by the timer and the number of retrying operations caused by a failure in transmission is measured. The sum of the period from the start of transmission to the end of transmission and a period obtained by multiplying the number of retrying operations by a time-out period is used as the measurement data of one communication period. The measurement of the communication period will be described in detail below.

The imaging operation unit 16 illustrated in FIG. 2 includes a communication period storage unit 59. The communication period storage unit 59 stores the communication period measurement data measured by the communication period measurement unit 58.

The communication period measurement unit 58 is an aspect of a captured data communication period acquisition unit. The communication period measurement unit 58 is an aspect of an operation command communication period acquisition unit. An aspect of the acquisition of the communication period of the captured data is the reading of the communication period measurement data from the communication period storage unit 59. An example of the acquisition of the operation command communication period is the reading of the communication period measurement data from the communication period storage unit 59.

The imaging terminal communication unit 40 illustrated in FIG. 2 transmits, to the pan/tilt operation unit 24, a pan/tilt driving control signal obtained by converting the pan/tilt operation parameters, which have been calculated by the angle-of-view adjustment operation unit 48 and then corrected by the pan/tilt operation parameter correction unit 54, into a radio signal. The pan/tilt operation unit 24 receives the pan/tilt driving control signal and performs a pan/tilt operation on the basis of the pan/tilt driving control signal.

The pan/tilt operation command unit 56 corresponds to pan/tilt operation command means.

<Description of Pan/Tilt Camera>

FIG. 3 is a block diagram illustrating the pan/tilt camera. As illustrated in FIG. 3, the pan/tilt camera 14 includes the imaging unit 22. The imaging operation of the imaging unit 22 is controlled by an imaging control unit 60. The imaging control unit 60 transmits a command indicated by the imaging control signal acquired through a camera communication unit 62 to the imaging unit 22 on the basis of the imaging control signal.

The camera communication unit 62 is a component of a captured data transmission unit and captured data transmission means.

The captured data obtained by the imaging operation of the imaging unit 22 is transmitted to the camera communication unit 62 through the imaging control unit 60. The camera communication unit 62 converts the captured data into a wireless communication signal and transmits the wireless communication signal to the imaging operation unit 16 illustrated in FIG. 2.

The pan/tilt camera 14 includes a pan driving unit 64. The pan driving unit 64 includes a motor which is a driving source and a pan driving mechanism connected to the motor. The driving of the pan driving unit 64 is controlled by a pan driving control unit 66. The pan driving control unit 66 includes a motor driver that controls the operation of the motor which is a driving source of the pan driving unit 64.

The pan/tilt camera 14 includes a tilt driving unit 68. The tilt driving unit 68 includes a motor which is a driving source and a tilt driving mechanism connected to the motor. The driving of the tilt driving unit 68 is controlled by a tilt driving control unit 70. The tilt driving control unit 70 includes a motor driver that controls the operation of the motor which is a driving source of the tilt driving unit 68.

The pan/tilt operation unit 24 illustrated in FIG. 1 includes the pan driving unit 64 and the tilt driving unit 68. In this embodiment, the pan/tilt operation includes at least one of a pan operation or a tilt operation.

In addition, the above-mentioned pan/tilt operation parameters include at least one of the operation parameters of the pan operation or the operation parameters of the tilt operation.

In a case in which the pan operation parameters are acquired through the camera communication unit 62, the imaging control unit 60 outputs a command based on the pan operation parameters to the pan driving control unit 66. The pan driving control unit 66 operates the pan driving unit 64 on the basis of the command.

Similarly, in a case in which the tilt operation parameters are acquired through the camera communication unit 62, the imaging control unit 60 outputs a command based on the tilt operation parameters to the tilt driving control unit 70. The tilt driving control unit 70 operates the tilt driving unit 68 on the basis of the command.

<Description of Imaging Unit>

Figure 4:
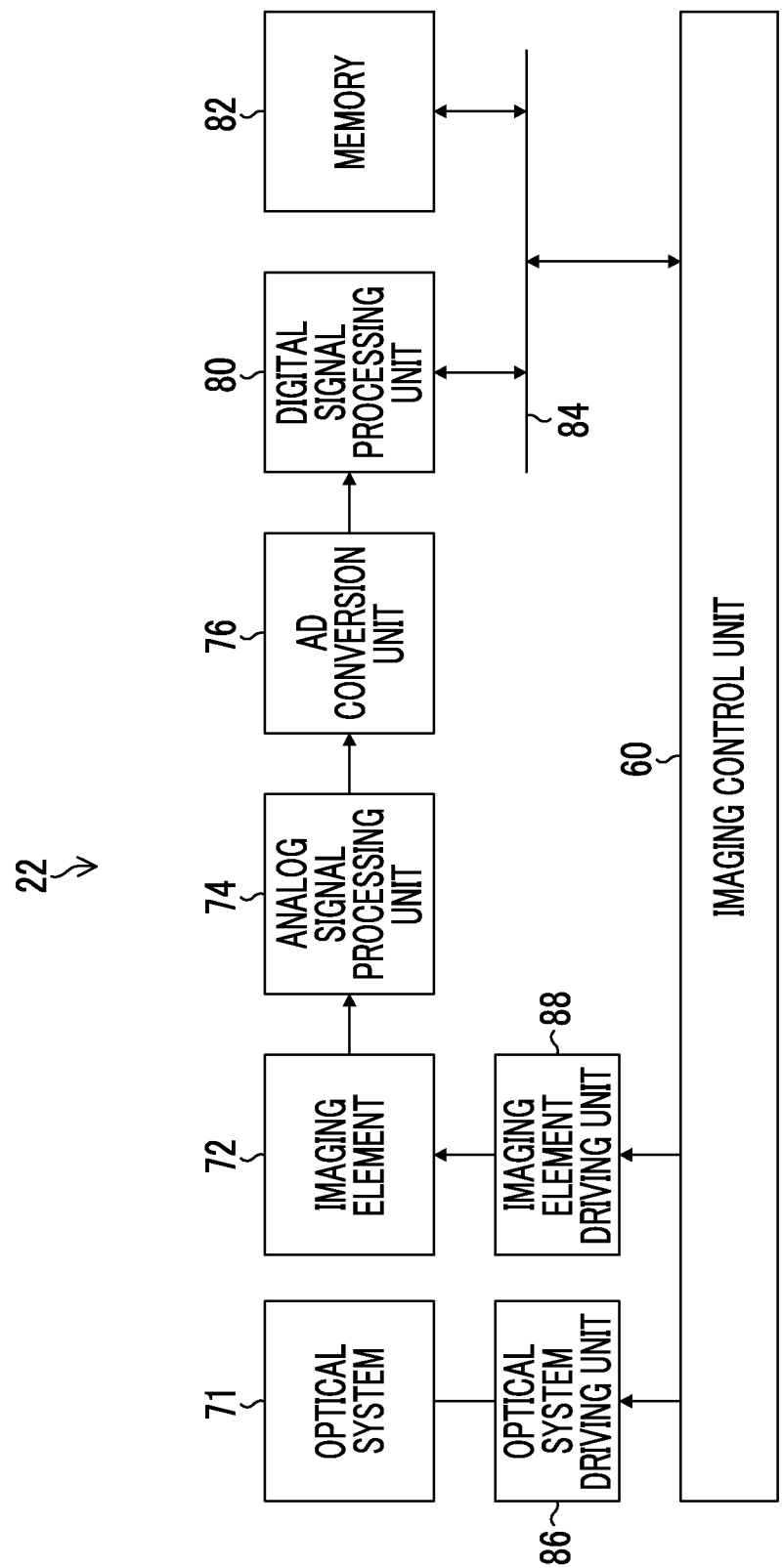
FIG. 4 is a block diagram illustrating an imaging unit.

FIG. 4 is a block diagram illustrating the imaging unit. As illustrated in FIG. 4, the imaging unit 22 includes an optical system 71. The optical system 71 includes a lens and a stop. The optical system 71 may include a lens group including a plurality of types of lenses.

The imaging unit 22 includes an imaging element 72. The imaging element 72 converts an optical image of an object which is incident through the optical system into an electric signal. A solid-state imaging element is applied as the imaging element 72. An example of the solid-state imaging element is a CCD image sensor or a CMOS image sensor.

The CCD is an abbreviation of a charge coupled device. The CMOS is an abbreviation of a complementary metal-oxide semiconductor.

The imaging unit 22 includes an analog signal processing unit 74. The analog signal processing unit 74 performs analog signal processing, such as automatic gain adjustment, for a captured signal which is an analog electric signal converted by the imaging element 72. The captured signal corresponds to captured data.

The imaging unit 22 includes an AD conversion unit 76. The AD conversion unit 76 converts the analog captured signal processed by the analog signal processing unit 74 into a digital captured signal. Letter A in the AD indicates analog. Letter D in the AD indicates digital.

The imaging unit 22 includes a digital signal processing unit 80. The digital signal processing unit 80 performs digital signal processing for the digital captured signal converted by the AD conversion unit 76.

The imaging unit 22 includes a memory 82. The memory 82 stores captured data corresponding to the digital captured signal processed by the digital signal processing unit 80. The captured data stored in the memory 82 is transmitted to the imaging operation unit 16 illustrated in FIG. 1 through a data bus 84, the imaging control unit 60, and the camera communication unit 62 illustrated in FIG. 3.

The imaging unit 22 includes an optical system driving unit 86. The optical system driving unit 86 controls the operation of the optical system 71 on the basis of a command transmitted from the imaging control unit 60. An example of the operation of the optical system 71 is zoom adjustment or stop adjustment.

The imaging unit 22 includes an imaging element driving unit 88. The imaging element driving unit 88 controls the operation of the imaging element 72, such as the exposure period or the charge read time of the imaging element 72, on the basis of a command transmitted from the imaging control unit 60.

The configuration of the imaging unit 22 illustrated in FIG. 4 is illustrative. An imaging device that can capture live view images, capture motion pictures, or continuously capture still images can be applied to the imaging unit 22. The imaging control unit 60 illustrated in FIG. 4 may include a portion that has at least a function of controlling the operation of the imaging unit 22 in the imaging control unit 60 illustrated in FIG. 3.

<Description of Moving Body and Moving Body Operation Unit>

Figure 5:
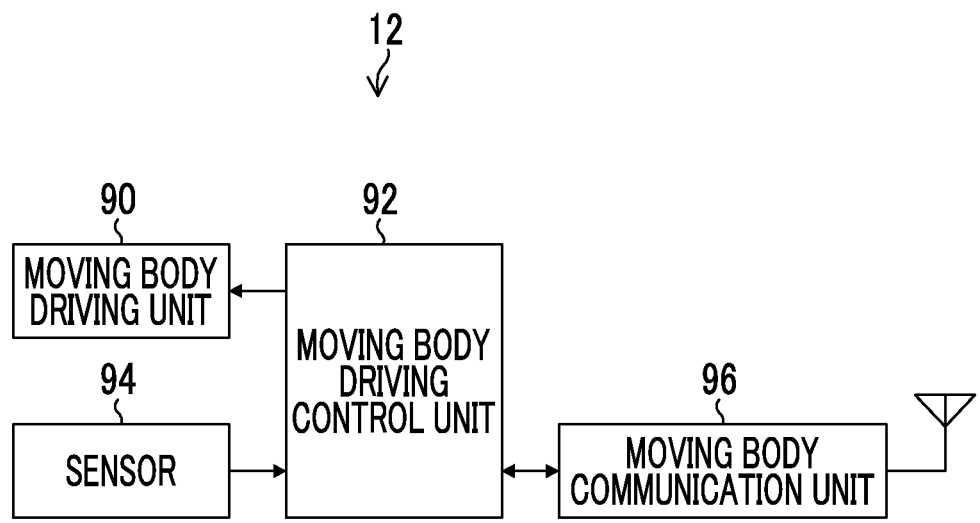
FIG. 5 is a block diagram illustrating a moving body.

FIG. 5 is a block diagram illustrating the moving body. The moving body 12 illustrated in FIG. 5 includes a moving body driving unit 90. The moving body driving unit 90 includes a motor which is a driving source and a driving mechanism connected to the motor.

The moving body 12 includes a moving body driving control unit 92. The driving of the moving body driving unit 90 is controlled by the moving body driving control unit 92. The moving body driving control unit 92 includes a motor driver that controls the operation of the motor which is a driving source of the moving body driving unit 90.

The moving body 12 includes a sensor 94. The sensor 94 includes various sensors, such as a position detection sensor that detects the position of the moving body 12 and an obstacle detection sensor that detects whether an obstacle is present in the traveling direction of the moving body 12.

A detection signal obtained from the sensor 94 is transmitted to the moving body driving control unit 92. The moving body driving control unit 92 acquires information indicated by the detection signal and uses the information for feedback on the operation control of the moving body driving unit 90.

The moving body 12 includes a moving body communication unit 96. The moving body communication unit 96 receives a moving body control signal transmitted from the moving body operation unit 18 illustrated in FIG. 1. The moving body communication unit 96 illustrated in FIG. 5 transmits the received moving body control signal to the moving body driving control unit 92. The moving body driving control unit 92 transmits a command to operate the moving body 12 to the moving body driving unit 90 on the basis of the moving body control signal.

In addition, the moving body communication unit 96 transmits the information indicated by the detection signal obtained from the sensor 94 to the moving body operation unit 18 illustrated in FIG. 1.

Figure 6:
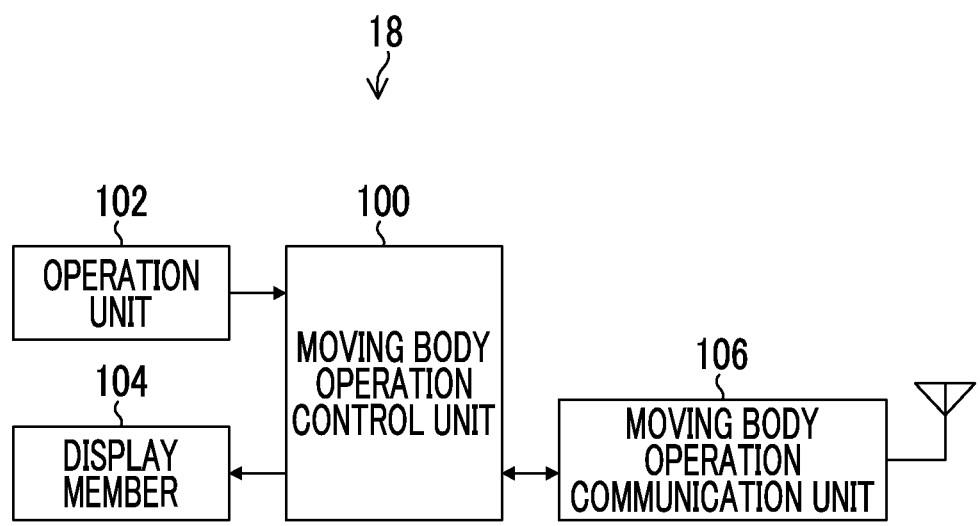
FIG. 6 is a block diagram illustrating a moving body operation terminal.

FIG. 6 is a block diagram illustrating the moving body operation terminal. The moving body operation unit 18 illustrated in FIG. 6 includes a moving body operation control unit 100. The moving body operation unit 18 includes an operation unit 102. The operation unit 102 is an operation member that is operated by the operator and includes, for example, the operation button 28, the lever 30, and the cross key 32 illustrated in FIG. 1. Information input by the operation of the operation unit 102 is transmitted to the moving body operation control unit 100.

The moving body operation unit 18 includes a display member 104. The display member 104 includes, for example, a power lamp indicating that power is turned on and a communication state display lamp indicating a communication state. The display member 104 is not illustrated in FIG. 1.

The moving body operation unit 18 illustrated in FIG. 6 includes a moving body operation communication unit 106. The moving body operation communication unit 106 transmits a control signal for the moving body 12 to the moving body 12 and receives the status information of the moving body 12.

The moving body 12, the pan/tilt camera 14, the imaging operation unit 16, and the moving body operation unit 18 described with reference to FIGS. 2 to 6 are illustrative and components may be added, changed, or removed.

The units illustrated in FIGS. 2 to 6 may be appropriately combined with each other or separated from each other. For example, the arithmetic units that perform various calculation operations may be integrated with each other or the storage units that store various kinds of information or data may be integrated with each other.

The arithmetic unit that is illustrated as one arithmetic unit in FIGS. 2 to 6 may be implemented by two or more processors or the storage unit that is illustrated as one storage unit may be implemented by two or more memories.

[Description of Adjustment of Angle of View]

<Outline>

Next, the adjustment of the angle of view of the pan/tilt camera 14 illustrated in, for example, FIG. 1 will be described. The captured image of the pan/tilt camera 14 received by the imaging terminal communication unit 40 of the imaging operation unit 16 illustrated in FIG. 2 is displayed on the display screen of the display unit 20. The display screen of the display unit 20 is represented by reference numeral 200 in, for example, FIG. 8A.

In a case in which an arbitrary region of the captured image displayed on the display screen of the display unit 20 is designated and a movement destination of the designated arbitrary region is designated, the angle of view of the pan/tilt camera 14 is automatically adjusted and the designated arbitrary region is moved to the designated movement destination on the display screen of the display unit 20.

In this embodiment, in a case in which an arbitrary position on the display screen of the display unit 20 is touched, the coordinate designation unit 46 designates the coordinates on the display screen of the display unit 20 which correspond to the arbitrary position on the display screen of the display unit 20.

In a case in which the designation coordinates which are the coordinates of a movement target and movement destination coordinates which are the coordinates of the movement destination of the movement target are designated, the pan/tilt operation unit 24 illustrated in FIG. 1 is operated, that is, the optical axis of the pan/tilt camera 14 is moved to adjust the angle of view of the pan/tilt camera 14 on the basis of the information of the designation coordinates and the movement destination coordinates.

The designation coordinates correspond to the above-mentioned first coordinates. In addition, the movement destination coordinates correspond to the above-mentioned second coordinates. That is, in a case in which two arbitrary regions of the display screen of the display unit 20 are designated in a state in which the captured image of the pan/tilt camera 14 is displayed on the display screen of the display unit 20, the adjustment of the angle of view of the pan/tilt camera 14 which is a process of moving the region that has been designated first to the position of the region that has been designated later is performed.

<Description of Task of Adjustment of Angle of View>

Figure 7A:
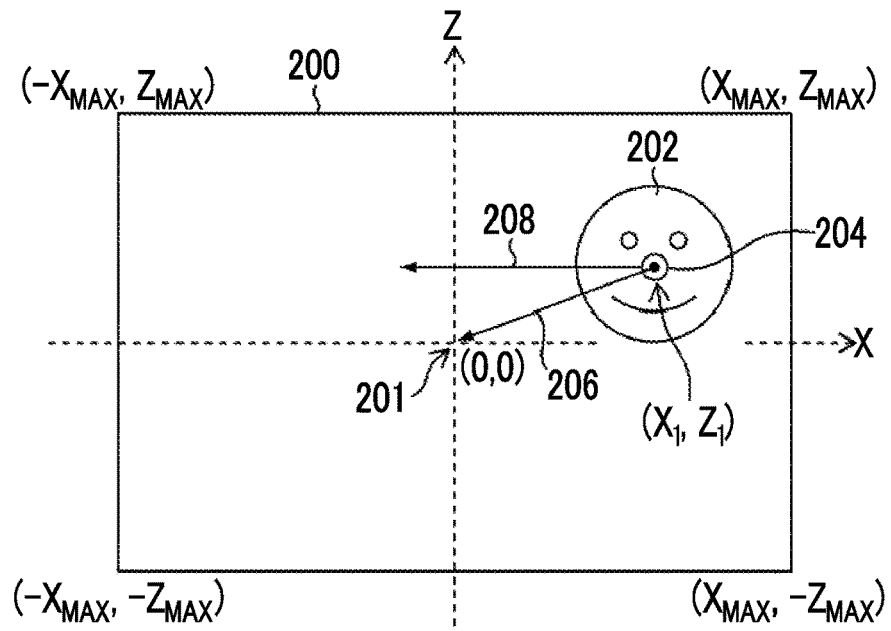
FIG. 7A and FIG. 7B are diagrams illustrating an angle-of-view adjustment method according to the related art.
Figure 7B:
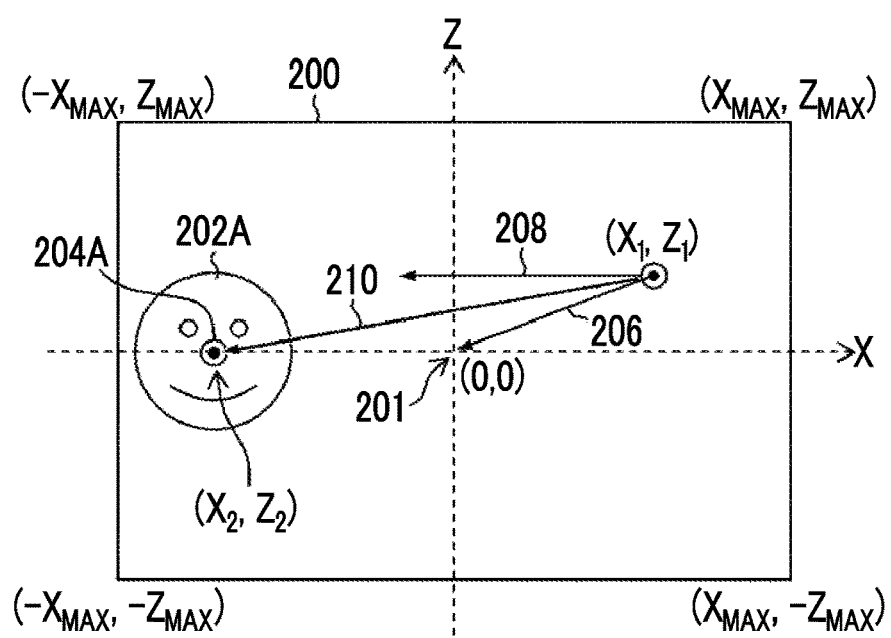

FIG. 7 is a diagram illustrating an angle-of-view adjustment method according to the related art. FIG. 7A is a diagram schematically illustrating a display state before the coordinates are input. FIG. 7B is a diagram schematically illustrating a display state after the coordinates are input.

It is assumed that the horizontal axis is the X-axis and the vertical axis is the Z-axis in the display screen 200 illustrated in FIGS. 7A and 7B. It is assumed that the coordinates of a central position 201 of the display screen 200 are (0, 0). It is assumed that the coordinates of an upper right corner of the display screen 200 are $(X_{MAX}, Z_{MAX})$. It is assumed that the coordinates of an upper left corner of the display screen 200 are $(-X_{MAX}, Z_{MAX})$. It is assumed that the coordinates of a lower left corner of the display screen 200 are $(-X_{MAX}, -Z_{MAX})$. It is assumed that the coordinates of a lower right corner of the display screen 200 are $(X_{MAX}, -Z_{MAX})$. It is assumed that the coordinates of an arbitrary point on the display screen 200 are (X, Z).

The following case is considered: the adjustment of the angle of view in a case in which a central position 204 of an object 202 is moved to the central position 201 of the display screen 200 in the captured image displayed on the display screen 200 illustrated in FIG. 7A is performed. The coordinates $(X_1, Z_1)$ of the central position 204 of the object 202 are designated as the designation coordinates. The coordinates (0, 0) of the central position 201 of the display screen 200 are designated as the movement destination coordinates.

In a case in which $(X_1, Z_1)$ is designated as the designation coordinates and (0, 0) is designated as the movement destination coordinates, a first motion vector 206 that has the central position 204 of the object 202 as a starting point and has the central position 201 of the display screen 200 as an end point is determined on the display screen 200. The first motion vector is an aspect of the pan/tilt operation parameters calculated by the angle-of-view adjustment operation unit 48 illustrated in FIG. 2.

In a case in which the moving body 12 illustrated in FIG. 1 is at a standstill, the angle of view of the pan/tilt camera 14 may be adjusted using the pan/tilt operation parameters calculated from the first motion vector 206 illustrated in FIG. 7A.

As described above, the pan/tilt camera 14 is moved in association with the movement of the moving body 12. A second motion vector 208 illustrated in FIG. 7A is a motion vector indicating the movement of the pan/tilt camera 14 associated with the movement of the moving body 12.

In a case in which the angle of view is adjusted while the moving body 12 is being moved, the image displayed on the display screen 200 after the angle of view is adjusted is displayed at a position that deviates from the central position 201 of the display screen 200 which is a desired movement destination as illustrated in FIG. 7B.

That is, in the display screen 200, a central position 204A of an object 202A after the angle of view is adjusted is moved to a position with the coordinates $(X_2, Z_2)$ which is an end point of a third motion vector 210 obtained by the vector addition of the first motion vector 206 and the second motion vector 208.

Therefore, in a case in which the angle of view is adjusted while the moving body 12 is being moved, it is necessary to consider a delay period which will be described below. Next, an angle-of-view adjustment method according to this embodiment will be described in detail below.

<Detailed Description of Angle-of-View Adjustment Method>

Figure 8A:
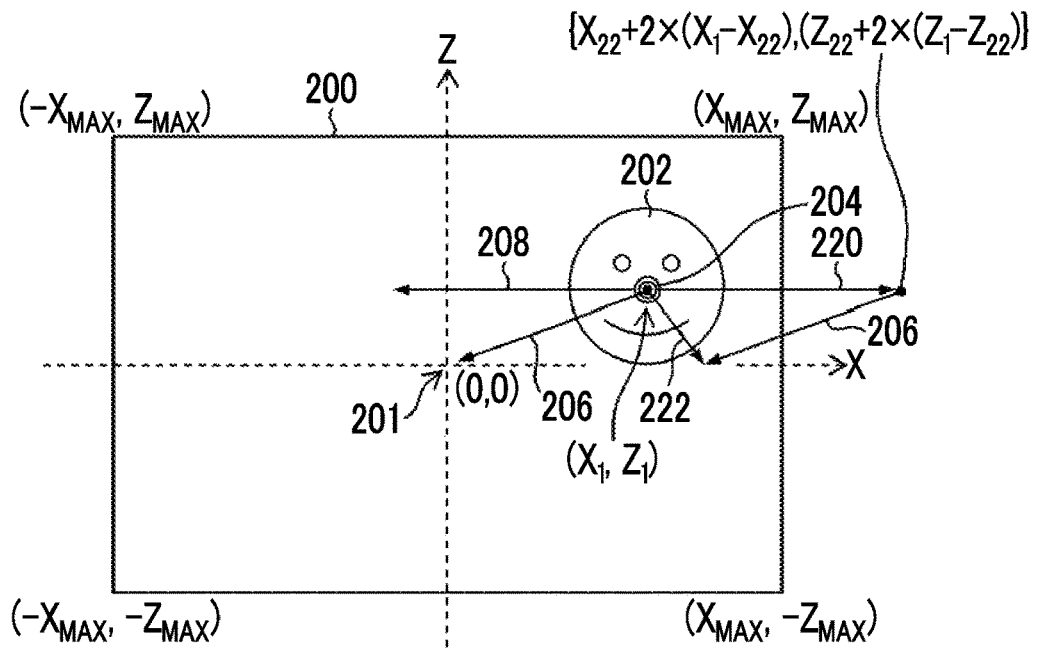
FIG. 8A and FIG. 8B are diagrams illustrating an angle-of-view adjustment method according to this embodiment.
Figure 8B:
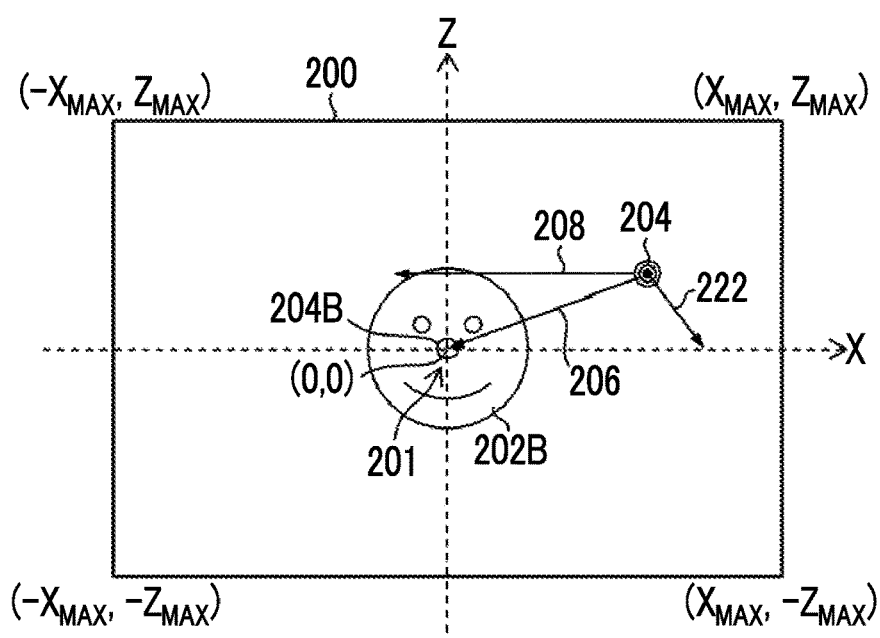

FIG. 8 is a diagram illustrating the angle-of-view adjustment method according to this embodiment. FIG. 8A is a diagram schematically illustrating a display state before the coordinates are designated. FIG. 8B is a diagram schematically illustrating a display state after the coordinates are designated.

In the angle-of-view adjustment method according to this embodiment, first, as illustrated in FIG. 8A, a correction vector 220 for cancelling a second motion vector 208 which is a motion vector of the pan/tilt camera 14 associated with the movement of the moving body 12 is calculated. Then, a fourth motion vector 222 which is a motion vector of the optical axis of the imaging unit after correction is calculated from the correction vector 220 and the first motion vector 206. The imaging unit is not illustrated in FIG. 8A. The imaging unit is represented by reference numeral 22 in, for example, FIG. 1. This holds for FIG. 8B.

The second motion vector 208 illustrated in FIG. 8A corresponds to a motion parameter of the pan/tilt camera 14 calculated by the movement state calculation unit 52 illustrated in FIG. 2. The pan/tilt operation parameter correction unit 54 illustrated in FIG. 2 corrects the operation parameters of the pan/tilt operation unit, using the correction vector 220 illustrated in FIG. 8A.

The correction vector 220 has the same magnitude as the second motion vector 208 and has a direction opposite to the direction of the second motion vector 208. In other words, the correction vector 220 is obtained by rotating the second motion vector 208 180 degrees.

In FIG. 8A, in a case in which the coordinates of an end point of the second motion vector 208 are $(X_{22}, Z_{22})$, the X coordinate of an end point of the correction vector is represented by $X_{22}+2\times(X_1-X_{22})$. In addition, the Z coordinate of the end point of the correction vector is represented by $Z_{22}+2\times(Z_1-Z_{22})$.

In a case in which the fourth motion vector 222 which is the motion vector of the optical axis of the imaging unit 22 after correction illustrated in FIG. 8A is calculated, the pan/tilt operation command unit 56 illustrated in FIG. 2 generates an operation command corresponding to the pan/tilt operation parameter on the basis of the fourth motion vector 222.

In a case in which the angle of view of the pan/tilt camera 14 is adjusted using the pan/tilt operation parameter corresponding to the fourth motion vector 222, an object that is represented by reference numeral 202B in FIG. 8B is moved to the central position 201 of the display screen 200.

The pan/tilt operation command unit 56 illustrated in FIG. 2 transmits the pan/tilt operation parameter corresponding to the fourth motion vector 222 illustrated in FIG. 8B to the pan/tilt operation unit 24 illustrated in FIG. 1 through the imaging terminal communication unit 40.

The angle-of-view adjustment period calculation unit 50 illustrated in FIG. 2 calculates the operating speed of the pan/tilt operation unit 24 illustrated in FIG. 1 as the pan/tilt operation parameter. The operating speed of the pan/tilt operation unit 24 is determined from a pan/tilt operation period $t_4$ illustrated in FIG. 9, the designation coordinates, and the movement destination coordinates.

Figure 9:
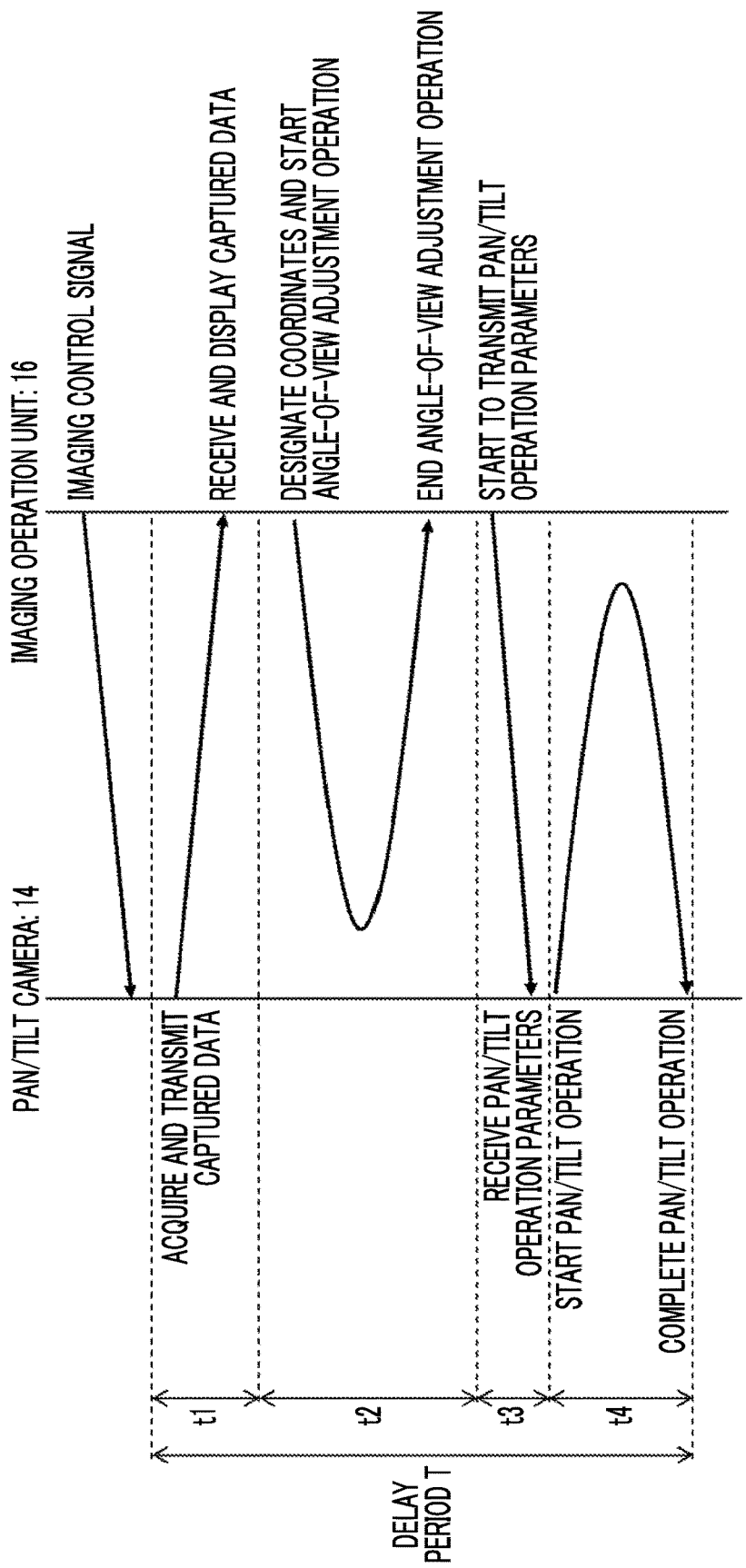
FIG. 9 is a diagram illustrating a delay period.

The angle-of-view adjustment period calculation unit 50 illustrated in FIG. 2 calculates the pan/tilt operation period $t_4$ illustrated in FIG. 9, using information about the angle of view of the lens in the imaging unit 22 which is acquired by the angle-of-view information acquisition unit 47 and the maximum operating speed of the pan/tilt operation unit 24. In a case in which the maximum operating speed of the pan/tilt operation unit 24 is $V\phi$ and the angle of view of the lens is FOV, the pan/tilt operation period $t_4$ is represented by $t_4=FOV/V\phi$.

The unit of the maximum operating speed $V\phi$ of the pan/tilt operation unit 24 is degrees per second. The unit of the angle of view FOV of the lens is degrees.

These information items are included in the pan/tilt operation parameters calculated by the angle-of-view adjustment period calculation unit 50.

The angle-of-view adjustment period calculation unit 50 is an aspect of a pan/tilt operation period acquisition unit. An example of the acquisition of the pan/tilt operation period is the calculation of the pan/tilt operation period $t_4$.

<Description of Delay Period>

Next, the delay period will be described in detail below. FIG. 9 is a diagram illustrating the delay period. As illustrated in FIG. 9, in a case in which the imaging operation unit 16 transmits an imaging control signal to the pan/tilt camera 14, the pan/tilt camera 14 starts to capture an image. It is assumed that the moving body 12 is being moved for the period for which the pan/tilt camera 14 captures an image.

The pan/tilt camera 14 transmits captured data indicating the captured image to the imaging operation unit 16 at a predetermined time. The period for which the pan/tilt camera 14 transmits the captured data to the imaging operation unit 16 is $t_1$.

Then, the designation coordinates and the movement destination coordinates are designated in the imaging operation unit 16. The angle-of-view adjustment operation unit 48 illustrated in FIG. 2 performs an angle-of-view adjustment operation of calculating the pan/tilt operation parameters. The angle-of-view adjustment period calculation unit 50 calculates an angle-of-view adjustment period. The movement state calculation unit 52 calculates the motion parameters of the pan/tilt camera 14. The pan/tilt operation parameter correction unit 54 corrects the pan/tilt operation parameters. As illustrated in FIG. 9, the period from the designation of the designation coordinates and the movement destination coordinates to the end of the calculation of the angle-of-view adjustment operation is $t_2$. The end of the angle-of-view adjustment operation means the calculation of the corrected pan/tilt operation parameters by the pan/tilt operation parameter correction unit 54.

In a case in which the pan/tilt operation parameters are calculated, the pan/tilt operation parameters are converted into a communication-format signal and are transmitted to the pan/tilt camera 14. As illustrated in FIG. 9, a pan/tilt operation parameter transmission period is $t_3$.

In a case in which the pan/tilt camera 14 receives the pan/tilt operation parameters, the pan/tilt operation unit 24 illustrated in FIG. 1 is operated to pan and tilt the pan/tilt camera 14. As illustrated in FIG. 9, a pan/tilt operation period from the acquisition of a pan/tilt operation command to the completion of the pan/tilt operation is $t_4$.

In a case in which the delay period when the angle of view is adjusted while the moving body 12 illustrated in FIG. 1 is being moved is T, the delay period T is represented by $T=t_1+t_2+t_3+t_4$. The unit of the captured data transmission period $t_1$, the angle-of-view adjustment operation period $t_2$, the pan/tilt operation parameter transmission period $t_3$, the pan/tilt operation period $t_4$, and the delay period T is seconds.

A relatively large variation in the captured data transmission period $t_1$ and the pan/tilt operation parameter transmission period $t_3$ occurs depending on a communication environment. Therefore, the captured data transmission period $t_1$ and the pan/tilt operation parameter transmission period $t_3$ are measured whenever the pan/tilt camera 14 and the imaging operation unit 16 communicate with each other.

In addition, the pan/tilt operation period $t_4$ is a fixed value. The angle-of-view adjustment operation period $t_2$ is much shorter than other periods. Therefore, a variation in the angle-of-view adjustment operation period $t_2$ is negligible.

The calculated delay period T is applied to the pan/tilt operation parameter correction process of the pan/tilt operation parameter correction unit 54 illustrated in FIG. 2.

<Description of Measurement of Communication Period>

Next, the captured data transmission period $t_1$ and the pan/tilt operation parameter transmission period $t_3$ illustrated in FIG. 9 will be described in detail. In the following description, the captured data transmission period $t_1$ and the pan/tilt operation parameter transmission period $t_3$ are generically referred to as a communication period. The captured data transmission period $t_1$ corresponds to a captured data communication period.

Figure 10:
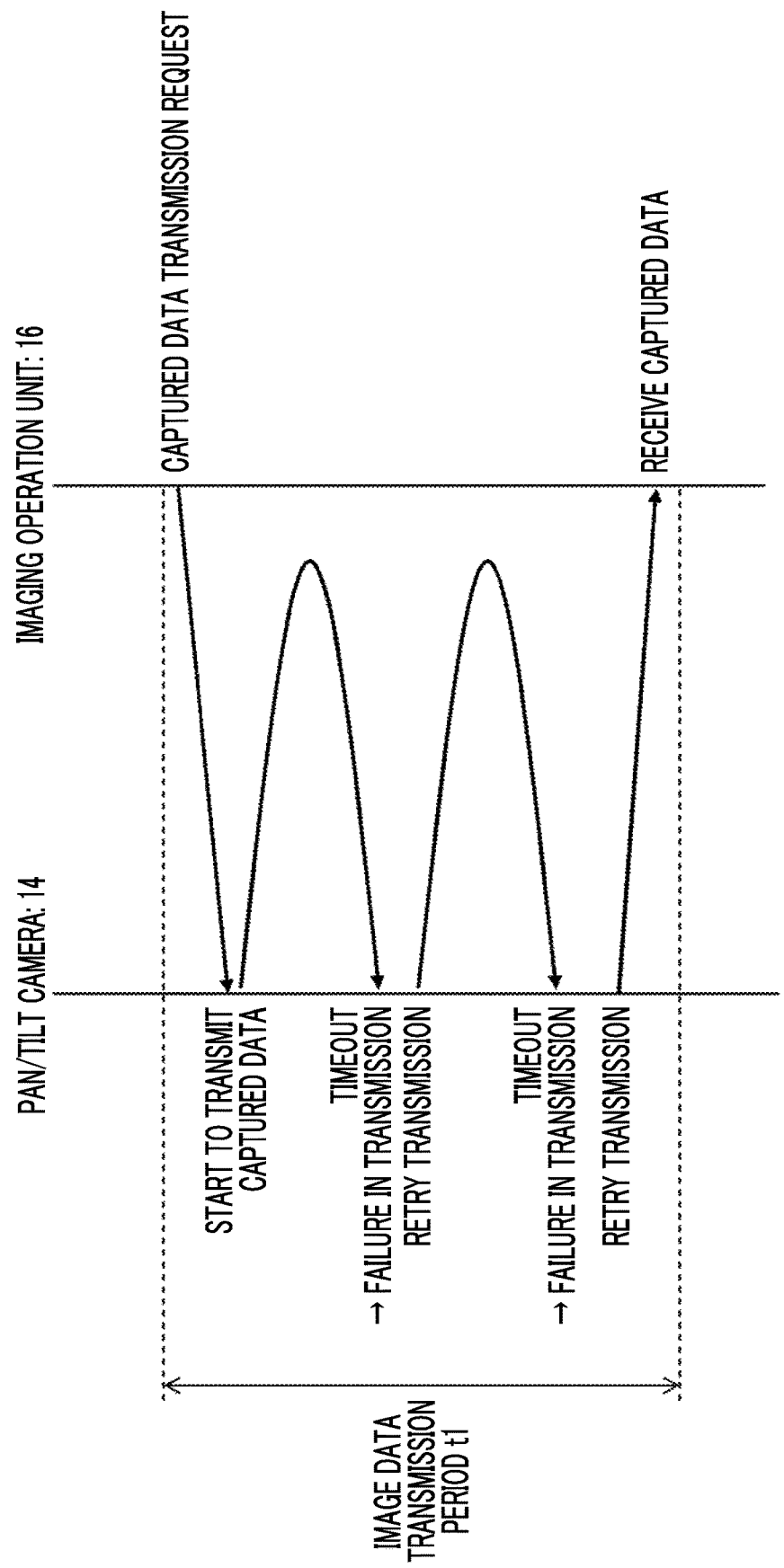
FIG. 10 is a diagram illustrating the measurement of a communication period.

FIG. 10 is a diagram illustrating the measurement of the communication period. FIG. 10 illustrates the procedure of the measurement of the captured data transmission period $t_1$ illustrated in FIG. 9 as the procedure of the measurement of the communication period. The captured data transmission period $t_1$ is measured by the communication period measurement unit 58 illustrated in FIG. 2. The measurement data of the captured data transmission period $t_1$ is stored in the communication period storage unit 59 illustrated in FIG. 2.

As illustrated in FIG. 10, first, a data transmission request is transmitted from the imaging operation unit 16 to the pan/tilt camera 14. In a case in which the pan/tilt camera 14 receives a captured data transmission request, the pan/tilt camera 14 transmits captured data.

In a case in which the transmission of the captured data does not end within a predetermined period, a timeout occurs and the transmission of the captured data is interrupted. In a case in which the transmission of the captured data is interrupted and the transmission of the captured data fails, a transmission retrying process of transmitting the captured data again is performed. The number of transmission retrying processes is predetermined.

On the other hand, in a case in which the transmission of the captured data ends within the predetermined period, the imaging operation unit 16 receives the captured data.

As the number of transmission retrying processes increases, the captured data transmission period $t_1$ increases. That is, the number of transmission retrying processes varies depending on, for example, the transmission state of the pan/tilt camera 14 and the reception state of the imaging operation unit 16.

Therefore, a variation in the data measured by each communication period measurement process occurs. For this reason, it is preferable that, for example, a statistical process of averaging measurement data obtained by several tens of measurement processes which are the measurement results of a plurality of measurement processes is performed to acquire the high-reliability and accurate measurement data of the communication period.

The pan/tilt operation parameter transmission period $t_3$ illustrated in FIG. 9 can be measured by the same procedure as the captured data transmission period $t_1$. The pan/tilt operation parameter transmission period $t_3$ is measured by the communication period measurement unit 58 illustrated in FIG. 2. The measurement data of the pan/tilt operation parameter transmission period $t_3$ is stored in the communication period storage unit 59 illustrated in FIG. 2.

The communication period that has been measured and stored in this way is applied to the calculation of the motion parameters of the pan/tilt camera 14 by the movement state calculation unit 52 illustrated in FIG. 2.

<Description of Calculation of Movement State>

Figure 11:
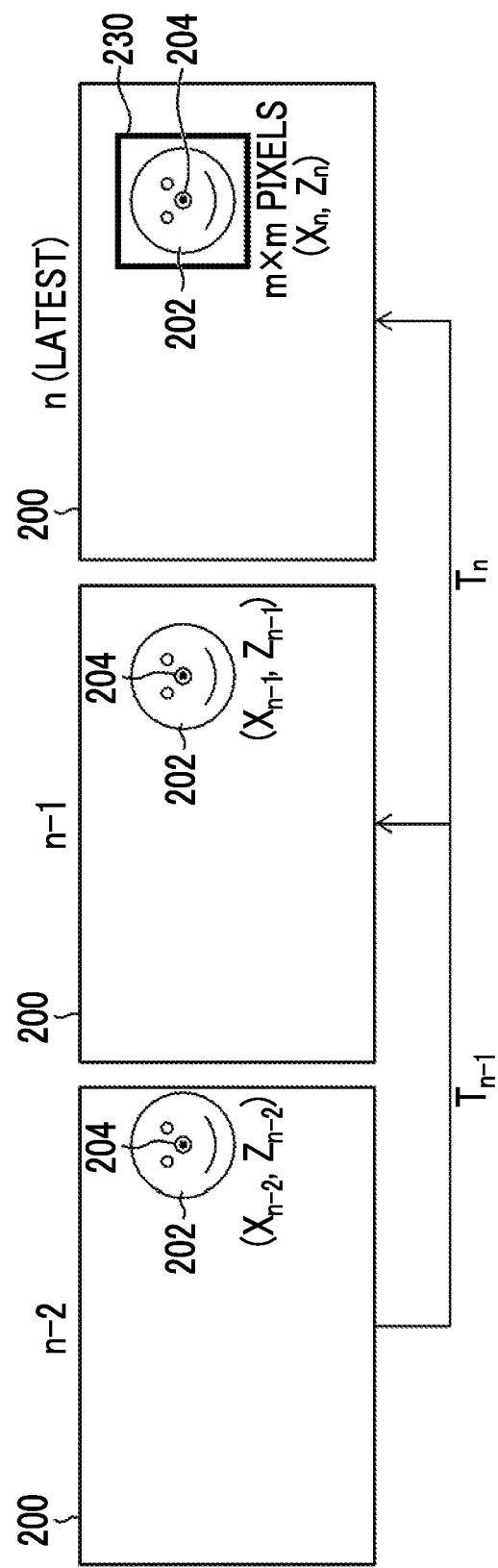
FIG. 11 is a diagram illustrating the calculation of a movement state.

Next, the calculation of the movement state by the movement state calculation unit 52 illustrated in FIG. 2 will be described in detail. FIG. 11 is a diagram illustrating the calculation of the movement state.

It is necessary to check the movement state of the moving body 12 in the adjustment of the angle of view while the moving body 12 illustrated in, for example, FIG. 1 is being moved. In the imaging system and the angle-of-view adjustment method according to this embodiment, the movement state of the moving body 12 is checked from the captured data of the pan/tilt camera 14.

An aspect is also considered in which the moving body includes a speed sensor and an acceleration sensor. It is necessary to separately acquire the distance between the pan/tilt camera 14 and the object in order to calculate a speed and acceleration in the display screen 200 illustrated in, for example, FIG. 8A. As a result, the imaging system is complicated.

In this embodiment, the second motion vector 208 indicating the movement state of the object 202 on the display screen 200 illustrated in FIG. 8A is calculated. Then, the correction vector 220 illustrated in FIG. 8A is calculated from the second motion vector 208 on the display screen 200.

In addition, the first motion vector 206 indicating the movement of the desired object 202 on the display screen 200 is corrected to calculate the fourth motion vector 222 indicating the movement of the desired object 202 on the display screen 200.

Then, the fourth motion vector 222 on the display screen 200 is converted from a two-dimensional rectangular coordinate system to a three-dimensional coordinate system such that an X component of the fourth motion vector 222 is converted into a pan operation angle and a Z component of the fourth motion vector 222 is converted into a tilt operation angle.

Next, calculation in the two-dimensional rectangular coordinate system on the display screen 200 will be described in detail.

It is assumed that the movement of the moving body 12 is a linear motion with constant acceleration. The movement distance s of an object that moves with constant acceleration is represented by $s=v_0+at/2$. Here, $v_0$ is an initial velocity, a is acceleration, and t is a period. That is, it is possible to know the position of the object after the period t by calculating the velocity and acceleration of the object 202 at the time when the command to adjust the angle of view is issued on the display screen 200.

In the imaging system 10 according to this embodiment, n captured images received by the imaging operation unit 16 are buffered in a FIFO manner. Here, n is an integer equal to or greater than 2. The FIFO is an abbreviation of First In First Out indicating a first-in first-out method.

In a case in which the designation coordinates and the movement destination coordinates are designated as the command to adjust the angle of view, a template with a size of m by m pixels which has the designation coordinates as the center is cut out from the latest image at the time when the movement destination coordinates are designated.

In addition, m may be an integer equal to or greater than 1. It is preferable that m is an integer equal to or greater than 2. The latest image at the time when the movement destination coordinates are designated means an image displayed on the display screen 200 at the time when the movement destination coordinates are designated.

The latest image which is an n-th image buffered in the FIFO manner is displayed on the display screen 200 illustrated at the right end of FIG. 11. The image displayed on the display screen 200 illustrated at the right end of FIG. 11 corresponds to first captured data acquired at a first time.

A template 230 with a size of m by m pixels is cut out from the image displayed on the display screen 200. It is assumed that the coordinates of the central position 204 of the object 202 are $(X_n, Z_n)$. The amount of movement is calculated by template matching using the template 230. In addition, an image acquisition period interval is separately acquired and a velocity vector and an acceleration vector are calculated. The template matching is an aspect of feature point detection.

An (n−1)-th image buffered in the FIFO manner is displayed on the display screen 200 illustrated at the center of FIG. 11. The image displayed on the display screen 200 illustrated at the center of FIG. 11 corresponds to second captured data acquired at a second time.

It is assumed that the coordinates of the central position 204 of the object 202 on the display screen 200 illustrated at the center of FIG. 11 are $(X_{n-1}, Z_{n-1})$. The image acquisition period interval between the n-th image and the (n−1)-th image is $T_n$. The image acquisition period interval $T_n$ between the n-th image and the (n−1)-th image corresponds to a first period.

An (n−2)-th image buffered in the FIFO manner is displayed on the display screen 200 illustrated at the left end of FIG. 11. The image displayed on the display screen 200 illustrated at the left end of FIG. 11 corresponds to third captured data acquired at a third time.

It is assumed that the coordinates of the central position 204 of the object 202 on the display screen 200 illustrated at the left end of FIG. 11 are $(X_{n-2}, Z_{n-2})$. The image acquisition period interval between the (n−1)-th image and the (n−2)-th image is $T_{n-1}$. The image acquisition period interval $T_{n-1}$ between the (n−1)-th image and the (n−2)-th image corresponds to a second period.

In a case in which an X component of a motion vector $D_n$ of the image displayed on the display screen 200 at the image acquisition period interval $T_n$ is $D_{nX}$, the X component $D_{nX}$ is represented by $D_{nX}=X_n-X_{n-1}$. Similarly, in a case in which a Z component of the motion vector $D_n$ of the image displayed on the display screen 200 at the image acquisition period interval $T_n$ is $D_{nZ}$, the Z component $D_{nZ}$ is represented by $D_{nZ}=Z_n-Z_{n-1}$.

The motion vector $D_n$ of the image displayed on the display screen 200 at the image acquisition period interval $T_n$ corresponds to the first motion vector 206 illustrated in, for example, FIG. 8A.

In a case in which an X component of a velocity vector $V_n$ of the n-th image is $V_{nX}$, the X component $V_{nX}$ is represented by $V_{nX}=|D_{nX}|/T_n=\{(X_n-X_{n-1})^2\}^{1/2}/T_n$. Similarly, in a case in which a Z component of the velocity vector $V_n$ of the n-th image is $V_{nZ}$, the Z component $V_{nZ}$ is represented by $V_{nZ}=|D_{nZ}|/T_n=\{(Z_n-Z_{n-1})^2\}^{1/2}/T_n$.

The velocity vector $V_n$ corresponds to a first velocity vector that has a magnitude obtained by dividing the magnitude of the first motion vector by the first period and has a direction parallel to the direction indicated by the first motion vector.

In a case in which an X component of an acceleration vector $A_n$ of the n-th image is $A_{nX}$, the X component $A_{nX}$ is represented by $A_{nX}=\{(V_{nX}-V_{n-1X})^2\}^{1/2}/T_{n-1}$. Here, $V_{n-1X}$ is an X component of a velocity vector $V_{n-1}$ of the (n−1)-th image and is represented by $V_{n-1X}=|D_{n-1X}|/T_{n-1}=\{(X_{n-1}-X_{n-2})^2\}^{1/2}/T_n$.

In a case in which a Z component of the acceleration vector $A_n$ of the n-th image is $A_{nZ}$, the Z component $A_{nZ}$ is represented by $A_{nZ}=\{(V_{nZ}-V_{n-1Z})^2\}^{1/2}/T_{n-1}$. Here, $V_{n-1Z}$ is a Z component of a velocity vector $V_{n-1}$ of the (n−1)-th image and is represented by $V_{n-1Z}=|D_{n-1Z}|=\{(Z_{n-1}-Z_{n-2})^2\}^{1/2}/T_n$.

A vector having an X component $X_{n-1}-X_{n-2}$ and a Z component $Z_{n-1}-Z_{n-2}$ corresponds to a second motion vector.

Here, $V_{n-1X}$ and $V_{n-1Z}$ correspond to a second velocity vector that has a magnitude obtained by dividing the magnitude of the second motion vector by the second period and has a direction parallel to the direction indicated by the second motion vector. In addition, $\{(V_{nX}-V_{n-1X})^2\}^{1/2}$ and $\{(V_{nZ}-V_{n-1Z})^2\}^{1/2}$ correspond to a difference vector obtained by subtracting the second velocity vector from the first velocity vector.

The acceleration vector $A_n$ corresponds to an acceleration vector that has a magnitude obtained by dividing the magnitude of the difference vector by the first period and has a direction parallel to the difference vector.

In a case in which the velocity vector $V_n$ and the acceleration vector $A_n$ of the n-th image are calculated in this way, a correction vector indicating the amount of movement of the image displayed on the display screen 200 for the delay period T illustrated in FIG. 9 is calculated. An X component of the correction vector is represented by $X_n + A_{nx} \times T^{1/2}/2$. Similarly, a Z component of the correction vector is represented by $Z_n + A_{nz} \times T^{1/2}/2$. The correction vector corresponds to the correction vector 220 illustrated in, for example, FIG. 8A.

In this embodiment, the aspect in which the motion vector, velocity vector, and acceleration vector of the latest image that is acquired last are calculated using three images acquired in time series has been description. However, the motion vectors, velocity vectors, and acceleration vectors of a plurality of images may be calculated and the motion vectors, the velocity vectors, and the acceleration vectors may be averaged.

In this way, it is possible to check the movement state of the object corresponding to the movement state of the moving body 12 and the imaging unit 22 on the display screen 200 of the display unit 20, using vector calculation on the basis of the captured data of the pan/tilt camera 14. Therefore, it is possible to check the movement state of the moving body 12, without providing detection means, such as a velocity sensor, an acceleration sensor, and a distance measurement sensor in the moving body 12.

Since the vector calculation is performed in the two-dimensional rectangular coordinate system, the vector calculation contributes to reducing the load of a calculation process and reducing the storage capacity of a memory used for calculation.

<Description of Conversion from Two-Dimensional Coordinate System to Three-Dimensional Coordinate System>

As described above, the pan/tilt operation parameters in the two-dimensional rectangular coordinate system calculated by the angle-of-view adjustment operation are converted into pan/tilt operation parameters in the three-dimensional coordinate system to calculate a pan angle and a tilt angle in the actual pan/tilt operation. Polar coordinates, particularly, spherical coordinates may be applied as the three-dimensional coordinates. The pan angle and the tilt angle correspond to displacement angles.

The two-dimensional rectangular coordinate system can be converted into the three-dimensional coordinate system by a known method. Therefore, the detailed description of the conversion will be omitted here. A process of converting the two-dimensional rectangular coordinate system into the polar coordinate system corresponds to a polar coordinate conversion process. A process of converting the two-dimensional rectangular coordinate system into the spherical coordinate system corresponds to a spherical coordinate conversion process. The polar coordinate conversion process is an aspect of a three-dimensional coordinate conversion process. The coordinate conversion process is another aspect of the three-dimensional coordinate conversion process.

[Description of Flowchart of Angle-of-View Adjustment Method]

Figure 12:
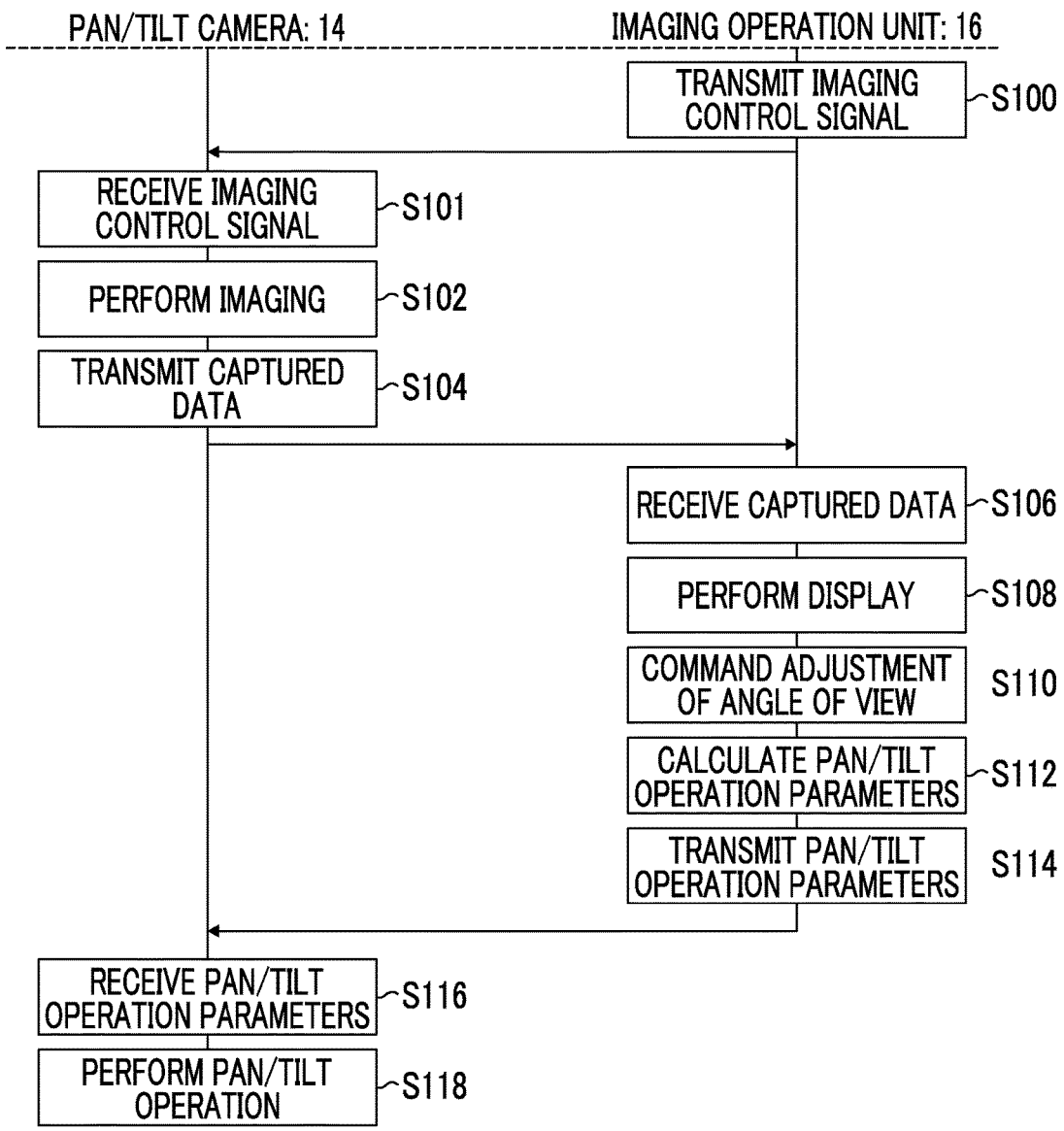
FIG. 12 is a flowchart illustrating the control flow of the angle-of-view adjustment method.

FIG. 12 is a flowchart illustrating the control flow of the angle-of-view adjustment method. In an imaging control signal transmission step S100, the imaging operation unit 16 transmits an imaging control signal to the pan/tilt camera 14. The imaging control signal transmission step S100 corresponds to an imaging operation step.

In a case in which the pan/tilt camera 14 receives the imaging control signal in an imaging control signal receiving step S101, imaging is performed using the imaging unit 22 illustrated in FIG. 1 in an imaging step S102. In a captured data transmission step S104, captured data acquired in the imaging step S102 illustrated in FIG. 12 is transmitted from the pan/tilt camera 14 to the imaging operation unit 16.

The imaging in the imaging step S102 and the transmission of the captured data in the captured data transmission step S104 are repeatedly performed until an imaging stop command is issued.

In a case in which the imaging operation unit 16 receives the captured data in a captured data receiving step S106, an image indicated by the received captured data is displayed on the display screen of the display unit 20 illustrated in FIG. 1 in a display step S108.

In a case in which a command to adjust the angle of view is issued in an angle-of-view adjustment command step S110 illustrated in FIG. 12, pan/tilt operation parameters are calculated in a pan/tilt operation parameter calculation step S112. The command to adjust the angle of view in the angle-of-view adjustment command step S110 is to designate the designation coordinates and the movement destination coordinates illustrated in FIG. 8A.

The angle-of-view adjustment command step S110 is an aspect of a coordinate designation step.

The pan/tilt operation parameters calculated in the pan/tilt operation parameter calculation step S112 is transmitted from the imaging operation unit 16 to the pan/tilt camera 14 in a pan/tilt operation parameter transmission step S114. The pan/tilt operation parameter calculation step S112 in the imaging operation unit 16 will be described in detail below.

In a case in which the pan/tilt camera 14 receives the pan/tilt operation parameters transmitted from the imaging operation unit 16 in a pan/tilt operation parameter receiving step S116, the pan/tilt operation unit 24 illustrated in FIG. 1 is operated to adjust the angle of view of the imaging unit 22 on the basis of the received pan/tilt operation parameters in a pan/tilt operation step S118.

The pan/tilt operation parameter transmission step S114, the pan/tilt operation parameter receiving step S116, and the pan/tilt operation step S118 are components of a pan/tilt operation command step.

Then, in a case in which the command to adjust the angle of view is issued in the angle-of-view adjustment command step S110 when the image is displayed on the display unit 20 illustrated in FIG. 1, the steps from the pan/tilt operation parameter calculation step S112 to the pan/tilt operation step S118 are performed.

Figure 13:
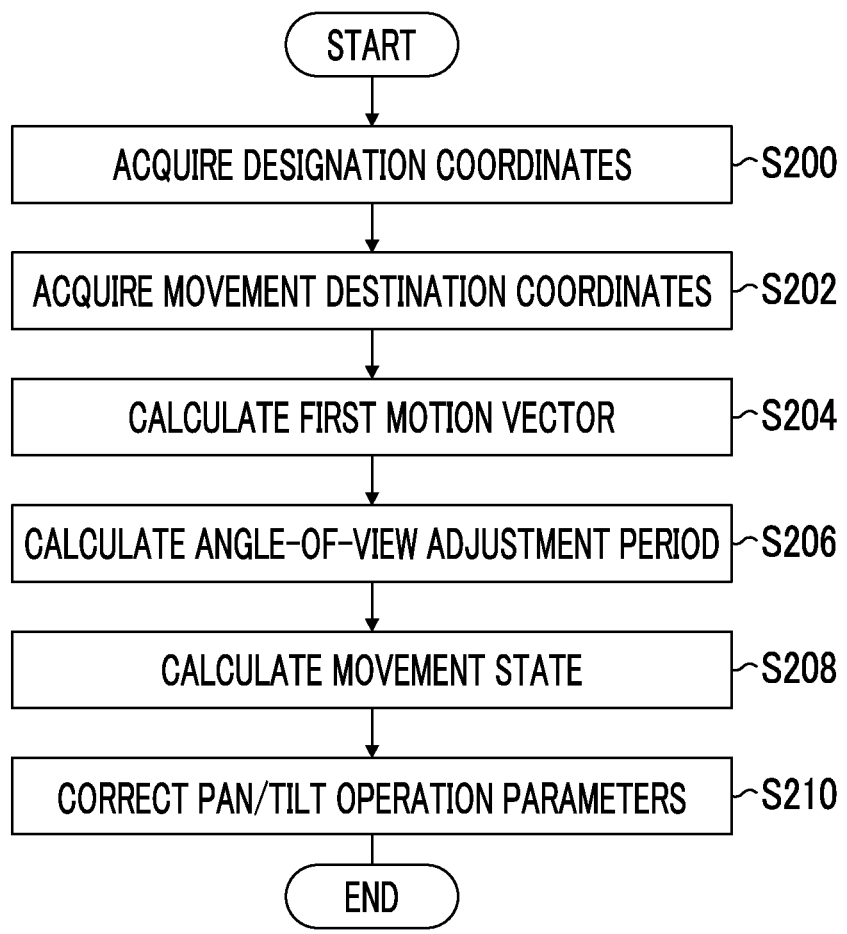
FIG. 13 is a flowchart illustrating the process procedure of a pan/tilt operation parameter calculation step illustrated in FIG. 12.

Next, the pan/tilt operation parameter calculation step illustrated in FIG. 12 will be described. FIG. 13 is a flowchart illustrating the process procedure of the pan/tilt operation parameter calculation step illustrated in FIG. 12.

In a case in which the designation coordinates are designated in the angle-of-view adjustment command step S110 illustrated in FIG. 12, the designated designation coordinates are acquired in a designated coordinate acquisition step S200 illustrated in FIG. 13. In addition, in a case in which the movement destination coordinates are designated in the angle-of-view adjustment command step S110 illustrated in FIG. 12, the designated movement destination coordinates are acquired in a movement destination coordinate acquisition step S202 illustrated in FIG. 13.

In a first motion vector calculation step S204, the first motion vector 206 illustrated in FIG. 8A is calculated. That is, the first motion vector which is a motion vector indicating the relative movement between the designation coordinates and the movement destination coordinates is calculated.

The first motion vector calculation step S204 is an aspect of an angle-of-view adjustment operation step.

In an angle-of-view adjustment period calculation step S206, the delay period T illustrated in FIG. 9, that is, the period from the issuing of the command to adjust the angle of view to the completion of the adjustment of the angle of view is calculated. Specifically, the captured data transmission period $t_1$, the angle-of-view adjustment operation period $t_2$, the pan/tilt operation parameter transmission period $t_3$, and the pan/tilt operation period $t_4$ illustrated in FIG. 9 are read and added to calculate an angle-of-view adjustment period which is the delay period T.

In a movement state calculation step S208 illustrated in FIG. 13, the second motion vector 208 illustrated in FIG. 8A which is a motion vector indicating the movement of the moving body 12 illustrated in FIG. 1 for the angle-of-view adjustment period calculated in the angle-of-view adjustment period calculation step S206 is calculated.

In a pan/tilt operation parameter correction step S210 illustrated in FIG. 13, the fourth motion vector 222 is calculated using the second motion vector 208 illustrated in FIG. 8A calculated in the movement state calculation step S208, the first motion vector 206 in FIG. 8A calculated in the first motion vector calculation step S204 illustrated in FIG. 13, or the correction vector 220.

In addition, the operation parameters of the pan/tilt operation in the display screen 200 illustrated in FIG. 8A are calculated.

A coordinate system conversion process of converting the two-dimensional rectangular coordinate system into the three-dimensional polar coordinate system is performed for the operation parameters of the pan/tilt operation in the display screen 200 illustrated in FIG. 8A. Movement in the X direction in the display screen 200 is converted into a displacement angle in the pan direction by the coordinate system conversion process. In addition, movement in the Z direction in the display screen 200 is converted into a displacement angle in the tilt direction by the coordinate system conversion process.

The calculated operation parameters of the pan/tilt operation are transmitted from the imaging operation unit 16 to the pan/tilt camera 14 in the pan/tilt operation parameter transmission step S114 illustrated in FIG. 12.

In this embodiment, the aspect in which the coordinate system conversion process of converting the two-dimensional rectangular coordinate system into the three-dimensional polar coordinate system is performed in the pan/tilt operation parameter calculation step S112 by the imaging operation unit 16 has been described. However, the coordinate system conversion process of converting the two-dimensional rectangular coordinate system into the three-dimensional polar coordinate system may be performed in the pan/tilt camera 14.

The pan/tilt operation period $t_4$ from the start of the pan/tilt operation to the end of the pan/tilt operation illustrated in FIG. 7 and the operating speed of the pan/tilt operation unit 24 illustrated in FIG. 1 are calculated as the pan/tilt operation parameters.

The pan/tilt operation period $t_4$ is calculated from the angle of view of the lens included in the optical system 71 illustrated in FIG. 4 and the maximum velocity of the pan/tilt operation.

The pan/tilt operation parameters may be any parameters as long as the rotation speed and the number of rotations of the motor included in the pan/tilt operation unit 24 illustrated in FIG. 1 can be calculated. The number of rotations is the number of rotations of the motor for the pan/tilt operation period.

<Description of Angle-of-View Adjustment Program>

A program that causes a computer to implement the functions of the imaging system 10 illustrated in FIG. 1 can be recorded on a CD-ROM, a magnetic disk, or other computer-readable media. Then, the program can be provided through an information storage medium.

The CD-ROM is an abbreviation of a compact disc read-only memory. The computer-readable medium indicates a non-transitory tangible information storage medium.

Instead of the aspect in which the program is stored in the information storage medium and then provided, a program signal may be provided as a download service through a communication network such as the Internet.

In addition, the following service may be provided: the imaging system described in the above-mentioned embodiment or all of the functions of the imaging system are implemented by an application server or cloud computing and the processing functions are provided through a network.

[Description of Function and Effect]

According to the imaging system, the angle-of-view adjustment method, and the angle-of-view adjustment program having the above-mentioned configuration, in a case in which the angle of view is adjusted while the pan/tilt camera is being moved, the movement state of the pan/tilt camera is checked and the pan/tilt operation parameters applied to adjust the angle of view are corrected. The positional deviation of the display image caused by the adjustment of the angle of view does not occur. Since the movement state of the pan/tilt camera is checked from the captured data obtained by the imaging operation of the pan/tilt camera, it is not necessary to provide separate means for detecting the movement state of the pan/tilt camera.

Furthermore, since vector calculation in the two-dimensional rectangular coordinate system on the display screen is applied to check the movement state of the pan/tilt camera, it is not necessary to perform a complicated calculation process and a calculation load is expected to be reduced.

In this embodiment, a running-type moving body is given as an example. However, a flying-type moving body, a ship-type moving body, or a moving body of a composite type of them may be used.

The technical scope of the invention is not limited to the scope of the above-described embodiment. For example, the configurations of each embodiment can be appropriately combined with each other, without departing from the scope and spirit of the invention.

EXPLANATION OF REFERENCES

10: imaging system
12: moving body
14: pan/tilt camera
16: imaging operation unit
20: display unit
22: imaging unit
24: pan/tilt operation unit
40: imaging terminal communication unit
42: imaging operation member
46: coordinate designation unit
48: angle-of-view adjustment operation unit
50: angle-of-view adjustment period calculation unit
52: movement state calculation unit
54: pan/tilt operation parameter correction unit 56: pan/tilt operation command unit
58: communication period measurement unit
60: imaging control unit
62: camera communication unit
64: pan driving unit
66: pan driving control unit
68: tilt driving unit
70: tilt driving control unit
200: display screen
202: object
206: first motion vector
208: second motion vector
210: third motion vector
220: correction vector
222: fourth motion vector
230: template

What is claimed is:

1. An imaging system comprising:
a moving body;
an imaging unit that is provided in the moving body;
a captured data transmission unit that transmits captured data obtained by an imaging operation of the imaging unit;
a captured data receiving unit that receives the captured data transmitted from the captured data transmission unit;
a pan/tilt operation unit that instructs the imaging unit to perform at least one of a pan operation or a tilt operation;
an imaging operation unit that is connected to the imaging unit so as to communicate with the imaging unit and transmits an imaging control signal for operating the imaging unit to the imaging unit;
a display unit that displays a captured image indicated by the captured data received by the captured data receiving unit on a display screen;
a coordinate designation unit that designates designation coordinates which are coordinates of a movement target and movement destination coordinates which are coordinates of a movement destination of the movement target in the image displayed on the display screen of the display unit in a case in which an angle of view of the imaging unit is adjusted;
an angle-of-view adjustment operation unit that calculates pan/tilt operation parameters applied to the pan/tilt operation unit, using the designation coordinates and the movement destination coordinates;
an angle-of-view adjustment period calculation unit that calculates an angle-of-view adjustment period which is a period from the designation of the designation coordinates to the adjustment of the angle of view of the imaging unit;
a movement state calculation unit that calculates motion parameters indicating a moving direction and a movement distance in a case in which the imaging unit is moved by the movement of the moving body for the angle-of-view adjustment period from the captured data obtained by the imaging operation of the imaging unit;
a pan/tilt operation parameter correction unit that corrects the pan/tilt operation parameters calculated by the angle-of-view adjustment operation unit on the basis of the motion parameters calculated by the movement state calculation unit and the angle-of-view adjustment period calculated by the angle-of-view adjustment period calculation unit in a case in which the angle of view of the imaging unit is adjusted; and
a pan/tilt operation command unit that transmits a signal corresponding to the pan/tilt operation parameters to the pan/tilt operation unit, using communication, and transmits a signal corresponding to the pan/tilt operation parameters corrected by the pan/tilt operation parameter correction unit to the pan/tilt operation unit.

2. The imaging system according to claim 1,
wherein the angle-of-view adjustment operation unit calculates a first motion vector as the pan/tilt operation parameters from the designation coordinates and the movement destination coordinates,
the movement state calculation unit calculates a correction vector as the motion parameters of the imaging unit during the angle-of-view adjustment period, and
the pan/tilt operation parameter correction unit corrects the pan/tilt operation parameters indicated by the first motion vector, using the correction vector.

3. The imaging system according to claim 2,
wherein the movement state calculation unit calculates, as the correction vector, a velocity vector indicating a velocity of the imaging unit in a case in which the imaging unit is moved by the movement of the moving body for the angle-of-view adjustment period and an acceleration vector indicating acceleration of the imaging unit in a case in which the imaging unit is moved by the movement of the moving body for the angle-of-view adjustment period.

4. The imaging system according to claim 3,
wherein the movement state calculation unit acquires the first motion vector indicating a movement distance and a moving direction of the imaging unit for a first period between a first time and a second time before the first time, from first captured data which is acquired by the imaging operation of the imaging unit at the first time and second captured data which is acquired by the imaging operation of the imaging unit at the second time, and
the movement state calculation unit calculates a first velocity vector that has a magnitude obtained by dividing a magnitude of the first motion vector by the first period and has a direction parallel to a direction indicated by the first motion vector.

5. The imaging system according to claim 4,
wherein the movement state calculation unit uses feature point detection to acquire the first motion vector.

6. The imaging system according to claim 4,
wherein the movement state calculation unit acquires a second motion vector indicating a movement distance and a moving direction of the imaging unit for a second period between the second time and a third time before the second time, from the second captured data and third captured data which is acquired by the imaging operation of the imaging unit at the third time,
the movement state calculation unit calculates a second velocity vector that has a magnitude obtained by dividing a magnitude of the second motion vector by the second period and has a direction parallel to a direction indicated by the second motion vector, and
the movement state calculation unit calculates an acceleration vector that has a magnitude obtained by dividing a magnitude of a difference vector, which is obtained by subtracting the second velocity vector from the first velocity vector, by the first period and has a direction parallel to the difference vector.

7. The imaging system according to claim 4,
wherein the movement state calculation unit uses the latest captured data acquired by the imaging operation of the imaging unit as the first captured data.

8. The imaging system according to claim 1,
wherein the angle-of-view adjustment operation unit calculates, as the pan/tilt operation parameters, an operating speed of the pan/tilt operation unit from a predetermined pan/tilt operation period from the start of a pan/tilt operation to the completion of the pan/tilt operation, the designation coordinates, and the movement destination coordinates.

9. The imaging system according to claim 8, further comprising:
an angle-of-view information acquisition unit that acquires information about the angle of view of a lens included in the imaging unit,
wherein the angle-of-view adjustment operation unit calculates the pan/tilt operation period, using a maximum operating speed of the pan/tilt operation unit and the angle of view of the lens included in the imaging unit.

10. The imaging system according to claim 9, further comprising:
a coordinate conversion processing unit that performs a polar coordinate conversion process of converting the designation coordinates and the movement destination coordinates represented by a two-dimensional coordinate system into three-dimensional coordinates, using the information about the angle of view of the imaging unit acquired by the angle-of-view information acquisition unit,
wherein the movement state calculation unit calculates, as the operation parameters of the pan/tilt operation unit, displacement angles of the designation coordinates and the movement destination coordinates in the three-dimensional coordinate system converted by the coordinate conversion processing unit.

11. The imaging system according to claim 1, further comprising:
a captured data communication period acquisition unit that acquires a captured data communication period which is a communication period of the captured data acquired by the imaging operation of the imaging unit;
an operation command communication period acquisition unit that acquires an operation command communication period which is a communication period of the operation command transmitted from the pan/tilt operation command unit; and
a pan/tilt operation period acquisition unit that acquires a pan/tilt operation period from the acquisition of the operation command by the pan/tilt operation unit to the completion of the operation of the pan/tilt operation unit,
wherein the angle-of-view adjustment period calculation unit adds the captured data communication period acquired by the captured data communication period acquisition unit, the operation command communication period acquired by the operation command communication period acquisition unit, and the pan/tilt operation period acquired by the pan/tilt operation period acquisition unit to calculate the angle-of-view adjustment period.

12. The imaging system according to claim 11, further comprising:
a communication period measurement unit that measures a period from a time when a captured data transmission request is transmitted to the imaging unit to a time when the captured data transmitted from the imaging unit is received,
wherein the captured data communication period acquisition unit acquires the period measured by the communication period measurement unit as the captured data communication period.

13. The imaging system according to claim 12,
wherein the captured data communication period acquisition unit acquires an average of a plurality of measurement results of the communication period measurement unit as the captured data communication period.

14. The imaging system according to claim 1, further comprising:
a moving body remote control unit that remotely controls the moving body and is provided independently of the imaging operation unit.

15. The imaging system according to claim 1,
wherein the angle-of-view adjustment operation unit uses coordinates of a central position of the display screen as the movement destination coordinates.

16. A method for adjusting an angle of view of an imaging unit that is provided in a moving body and is capable of performing at least one of a pan operation or a tilt operation, the method comprising:
a captured data transmission step of transmitting captured data obtained by an imaging operation of the imaging unit;
a captured data receiving step of receiving the captured data transmitted in the captured data transmission step;
an imaging operation step of transmitting an imaging control signal for operating the imaging unit to the imaging unit, using communication;
a display step of displaying a captured image indicated by the captured data received in the captured data receiving step on a display screen;
a coordinate designation step of designating designation coordinates which are coordinates of a movement target and movement destination coordinates which are coordinates of a movement destination of the movement target in the image displayed on the display screen in a case in which the angle of view of the imaging unit is adjusted;
an angle-of-view adjustment operation step of calculating pan/tilt operation parameters, using the designation coordinates and the movement destination coordinates;
an angle-of-view adjustment period calculation step of calculating an angle-of-view adjustment period which is a period from the designation of the designation coordinates to the adjustment of the angle of view of the imaging unit;
a movement state calculation step of calculating motion parameters indicating a moving direction and a movement distance in a case in which the imaging unit is moved by the movement of the moving body for the angle-of-view adjustment period from the captured data obtained by the imaging operation of the imaging unit;
a pan/tilt operation parameter correction step of correcting the pan/tilt operation parameters calculated in the angle-of-view adjustment operation step on the basis of the motion parameters calculated in the movement state calculation step and the angle-of-view adjustment period calculated in the angle-of-view adjustment period calculation step in a case in which the angle of view of the imaging unit is adjusted; and a pan/tilt operation command step of instructing the imaging unit to perform at least one of the pan operation or the tilt operation on the basis of the pan/tilt operation parameters corrected in the pan/tilt operation parameter correction step.

17. A computer-readable non-transitory tangible medium storing an angle-of-view adjustment program that causes a computer to function as:

imaging means provided in a moving body;

captured data transmission means for transmitting captured data obtained by an imaging operation of the imaging means;

captured data receiving means for receiving the captured data transmitted from the captured data transmission means;

pan/tilt operation means for instructing the imaging means to perform at least one of a pan operation or a tilt operation;

imaging operation means that is connected to the imaging means so as to communicate with the imaging means and transmits an imaging control signal for operating the imaging means to the imaging means;

display means for displaying a captured image indicated by the captured data received by the captured data receiving means on a display screen;

coordinate designation means for designating designation coordinates which are coordinates of a movement target and movement destination coordinates which are coordinates of a movement destination of the movement target in the image displayed on the display screen of the display means in a case in which an angle of view of the imaging means is adjusted;

angle-of-view adjustment operation means for calculating pan/tilt operation parameters applied to the pan/tilt operation means, using the designation coordinates and the movement destination coordinates;

angle-of-view adjustment period calculation means for calculating an angle-of-view adjustment period which is a period from the designation of the designation coordinates to the adjustment of the angle of view of the imaging means;

movement state calculation means for calculating motion parameters indicating a moving direction and a movement distance in a case in which the imaging means is moved by the movement of the moving body for the angle-of-view adjustment period from the captured data obtained by the imaging operation of the imaging means;

pan/tilt operation parameter correction means for correcting the pan/tilt operation parameters calculated by the angle-of-view adjustment operation means on the basis of the motion parameters calculated by the movement state calculation means and the angle-of-view adjustment period calculated by the angle-of-view adjustment period calculation means in a case in which the angle of view of the imaging means is adjusted; and pan/tilt operation command means for transmitting a signal corresponding to the pan/tilt operation parameters to the pan/tilt operation means, using communication, and transmitting a signal corresponding to the pan/tilt operation parameters corrected by the pan/tilt operation parameter correction means to the pan/tilt operation means.

* * * * *